US011822787B2

(12) United States Patent
Sato et al.

(10) Patent No.: US 11,822,787 B2
(45) Date of Patent: Nov. 21, 2023

(54) STORAGE SYSTEM AND QOS MANAGEMENT METHOD IN STORAGE SYSTEM

(71) Applicant: Hitachi, Ltd., Tokyo (JP)

(72) Inventors: Kenta Sato, Tokyo (JP); Kazuei Hironaka, Tokyo (JP); Takanobu Suzuki, Tokyo (JP); Akira Deguchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 106 days.

(21) Appl. No.: 17/692,796

(22) Filed: Mar. 11, 2022

(65) Prior Publication Data
US 2023/0063179 A1    Mar. 2, 2023

(30) Foreign Application Priority Data
Aug. 31, 2021  (JP) ................................ 2021-140747

(51) Int. Cl.
*G06F 12/00* (2006.01)
*G06F 3/06* (2006.01)

(52) U.S. Cl.
CPC .......... *G06F 3/0604* (2013.01); *G06F 3/0653* (2013.01); *G06F 3/0673* (2013.01)

(58) Field of Classification Search
CPC .... G06F 3/0604; G06F 3/0653; G06F 3/0673; G06F 3/061; G06F 3/0634; G06F 3/067
See application file for complete search history.

(56) References Cited

U.S. PATENT DOCUMENTS

| | | | | |
|---|---|---|---|---|
| 8,578,121 | B2* | 11/2013 | Ikeda | G06F 11/1402 |
| | | | | 711/170 |
| 9,870,330 | B2* | 1/2018 | Faulkner | G06F 3/0605 |
| 11,140,219 | B1* | 10/2021 | Cady | G06F 7/535 |
| 2013/0086270 | A1 | 4/2013 | Nishikawa et al. | |
| 2015/0074349 | A1* | 3/2015 | Naganuma | G06F 3/0685 |
| | | | | 711/114 |
| 2015/0234618 | A1* | 8/2015 | Miwa | G06F 3/0617 |
| | | | | 711/165 |
| 2016/0231928 | A1* | 8/2016 | Lewis | G06F 3/0638 |

FOREIGN PATENT DOCUMENTS

WO       2013/051056 A1    4/2013

* cited by examiner

Primary Examiner — John A Lane
(74) Attorney, Agent, or Firm — Procopio, Cory, Hargreaves & Savitch LLP

(57) ABSTRACT

The present invention is directed to realize a QoS function in the unit of a virtual volume group existing over a plurality of storage apparatuses. A management system of a storage system forms a virtual volume group by using a plurality of volumes provided by a plurality of storage apparatuses. In the virtual volume group, a QoS setting value including a data input/output amount is set. IO processing ability provided from each of the volumes to the virtual volume group is set so as to satisfy the QoS setting value. The management system sets the IC processing ability provided from each of the volumes to the virtual volume group on the basis of operation information of each of the volumes.

8 Claims, 26 Drawing Sheets

FIG. 6

CAPACITY POOL CONTROL INFORMATION

| CAPACITY POOL ID (0500) | TOTAL CAPACITY (0501) | USED CAPACITY (0502) | PHYSICAL DISK ID (0503) | RAID LEVEL (0504) | ... |
|---|---|---|---|---|---|
| 0 | 100TB | 30TB | 0 | RAID6 | ... |
|   |       |      | 1 |       | ... |
|   |       |      | 2 |       | ... |
|   |       |      | 3 |       | ... |
|   |       |      | 4 |       | ... |
| 1 | 40TB | 10TB | 5 | RAID5 | ... |
|   |      |      | 6 |       | ... |
|   |      |      | 7 |       | ... |
|   |      |      | 8 |       | ... |
| ... | ... | ... | ... | ... | ... |

FIG. 7

VOLUME CONTROL INFORMATION

| VOLUME ID (0600) | CAPACITY POOL ID (0601) | CAPACITY (0602) | ... |
|---|---|---|---|
| 0 | 0 | 100GB | ... |
| 1 | 0 | 400GB | ... |
| 2 | 0 | 300GB | ... |
| 3 | 0 | 1000GB | ... |
| 4 | 1 | 500GB | ... |
| 5 | 1 | 300GB | ... |
| 6 | 1 | 800GB | ... |
| ... | ... | ... | ... |

FIG. 8

PATH CONTROL INFORMATION

| VOLUME ID | HOST WWN | LUN | ... |
|---|---|---|---|
| 0 | 0011223344556677 | 0 | ... |
| 1 | 0011223344556677 | 1 | ... |
| 2 | 1122334455667788 | 0 | ... |
| 3 | 2233445566778899 | 0 | ... |
| 4 | 2233445566778899 | 1 | ... |
| ... | ... | ... | ... |

VOLUME GROUP CONTROL INFORMATION

| VOLUME GROUP ID (0800) | QoS SETTING (0801) | VOLUME ID (0802) | ... |
|---|---|---|---|
| 0 | 6k IOPS | 0 | ... |
| | | 1 | |
| 1 | 3k IOPS | 2 | ... |
| | | 3 | ... |
| 2 | 1.5k IOPS | 4 | |
| | | 5 | ... |
| | | 6 | ... |
| ... | ... | ... | ... |

STORAGE APPARATUS OPERATION INFORMATION

FIG. 11

VOLUME OPERATION INFORMATION

| VOLUME ID | AVERAGE IOPS | AVERAGE TRANSFER RATE | AVERAGE RESPONSE | ... |
|---|---|---|---|---|
| 0 | 3k | 12 MB/s | 0.5 ms | ... |
| 1 | 1k | 8 MB/s | 0.6 ms | ... |
| 2 | 2k | 10 MB/s | 0.5 ms | ... |
| ... | ... | ... | ... | ... |

CONTRACT MANAGEMENT INFORMATION

| 1100 | 1101 | 1102 | 1103 | 1104 | |
|---|---|---|---|---|---|
| CUSTOMER ID | VIRTUAL VOLUME GROUP ID | CONTRACT CAPACITY | CONTRACT PERFORMANCE | CONTRACT RAID LEVEL | |
| 0000 | 0 | 10TB | UPPER LIMIT IOPS = 15k IOPS AVERAGE RESPONSE < 2 ms | RAID6 | ... |
| | 2 | 5TB | UPPER LIMIT IOPS = 3k IOPS AVERAGE RESPONSE < 2 ms | RAID5 | ... |
| 0001 | 1 | 3TB | UPPER LIMIT IOPS = 5k IOPS AVERAGE RESPONSE < 5 ms | RAID6 | ... |
| | ... | ... | ... | ... | ... |

FIG. 13

DEVICE MANAGEMENT INFORMATION

| DEVICE ID | CPU USAGE RATIO | MEMORY USAGE RATIO | CAPACITY POOL ID | TOTAL CAPACITY | USED CAPACITY | RAID LEVEL | ... |
|---|---|---|---|---|---|---|---|
| 0 | 40% | 60% | 0 | 100 TB | 30 TB | RAID6 | ... |
| | | | 1 | 40 TB | 10 TB | RAID5 | ... |
| 1 | 50% | 68% | 2 | 100 TB | 5 TB | RAID6 | ... |
| ... | ... | ... | ... | ... | ... | ... | ... |

VIRTUAL VOLUME GROUP MANAGEMENT INFORMATION

| VIRTUAL VOLUME GROUP ID 1300 | DEVICE ID 1301 | VOLUME GROUP ID 1302 | USED CAPACITY 1303 | AVERAGE IOPS 1304 | AVERAGE TRANSFER RATE 1305 | AVERAGE RESPONSE 1306 | QoS SETTING VALUE 1307 | ... |
|---|---|---|---|---|---|---|---|---|
| 0 | 0 | 0 | 2 TB | 4 kIOPS | 16 MB/s | 0.5 ms | 6k IOPS | ... |
|   | 1 | 1 | 3 TB | 6 kIOPS | 24 MB/s | 0.6 ms | 9k IOPS | ... |
| 1 | 0 | 1 | 1 TB | 3 kIOPS | 12 MB/s | 1.5 ms | 3k IOPS | ... |
|   | 1 | 0 | 1 TB | 2 kIOPS | 8 MB/s | 1.5 ms | 2k IOPS | ... |
| ... | ... | ... | ... | ... | ... | ... | ... | ... |

FIG. 15

VOLUME OPERATION INFORMATION HISTORY INFORMATION

| DEVICE ID | VOLUME GROUP ID | VOLUME ID | TIMESTAMP | CAPACITY | AVERAGE IOPS | AVERAGE TRANSFER RATE | AVERAGE RESPONSE | ... |
|---|---|---|---|---|---|---|---|---|
| 0 | 0 | 1 | 10:00:00 | 100GB | 2k IOPS | 8 MB/s | 0.4 ms | ... |
|  |  | 1 | 10:00:30 | 100GB | 3k IOPS | 12 MB/s | 0.5 ms | ... |
|  |  | 2 | 10:01:00 | 120GB | 3k IOPS | 12 MB/s | 0.6 ms | ... |
|  |  | 2 | 10:01:00 | 400GB | 1k IOPS | 8 MB/s | 0.5 ms | ... |
| 1 | 0 |  | 10:00:00 | 300GB | 5k IOPS | 20 MB/s | 0.8 ms | ... |
|  |  |  | 10:00:30 | 300GB | 6k IOPS | 24 MB/s | 0.8 ms | ... |
| ... | ... | ... | ... | ... | ... | ... | ... | ... |

STORAGE APPARATUS OPERATION INFORMATION HISTORY INFORMATION

| DEVICE ID | TIMESTAMP | CPU USAGE RATIO | MEMORY USAGE RATIO | ... |
|---|---|---|---|---|
| 0 | 10:00:00 | 40% | 57% | ... |
| | 10:00:30 | 38% | 58% | ... |
| | 10:01:00 | 42% | 57% | ... |
| 1 | 10:00:00 | 50% | 70% | ... |
| | 10:00:30 | 53% | 85% | ... |
| ... | ... | ... | ... | ... |

1500 / 1501 / 1502 / 1503

QoS INITIAL ADJUSTMENT PROCESS FLOW

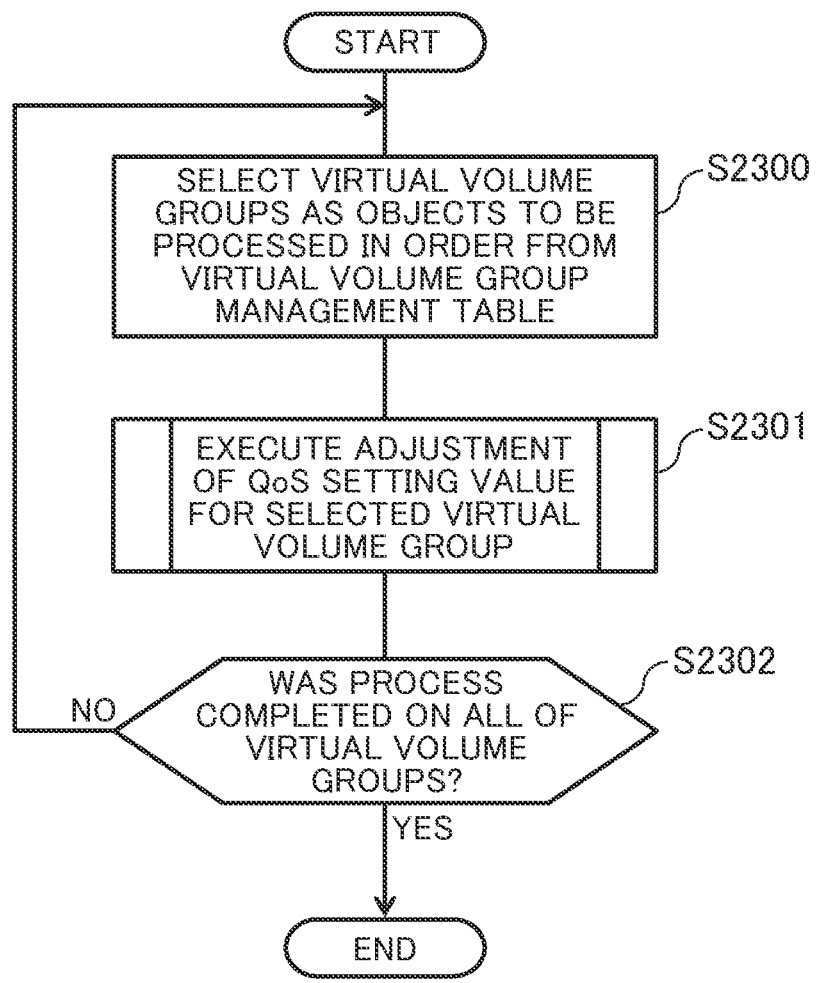

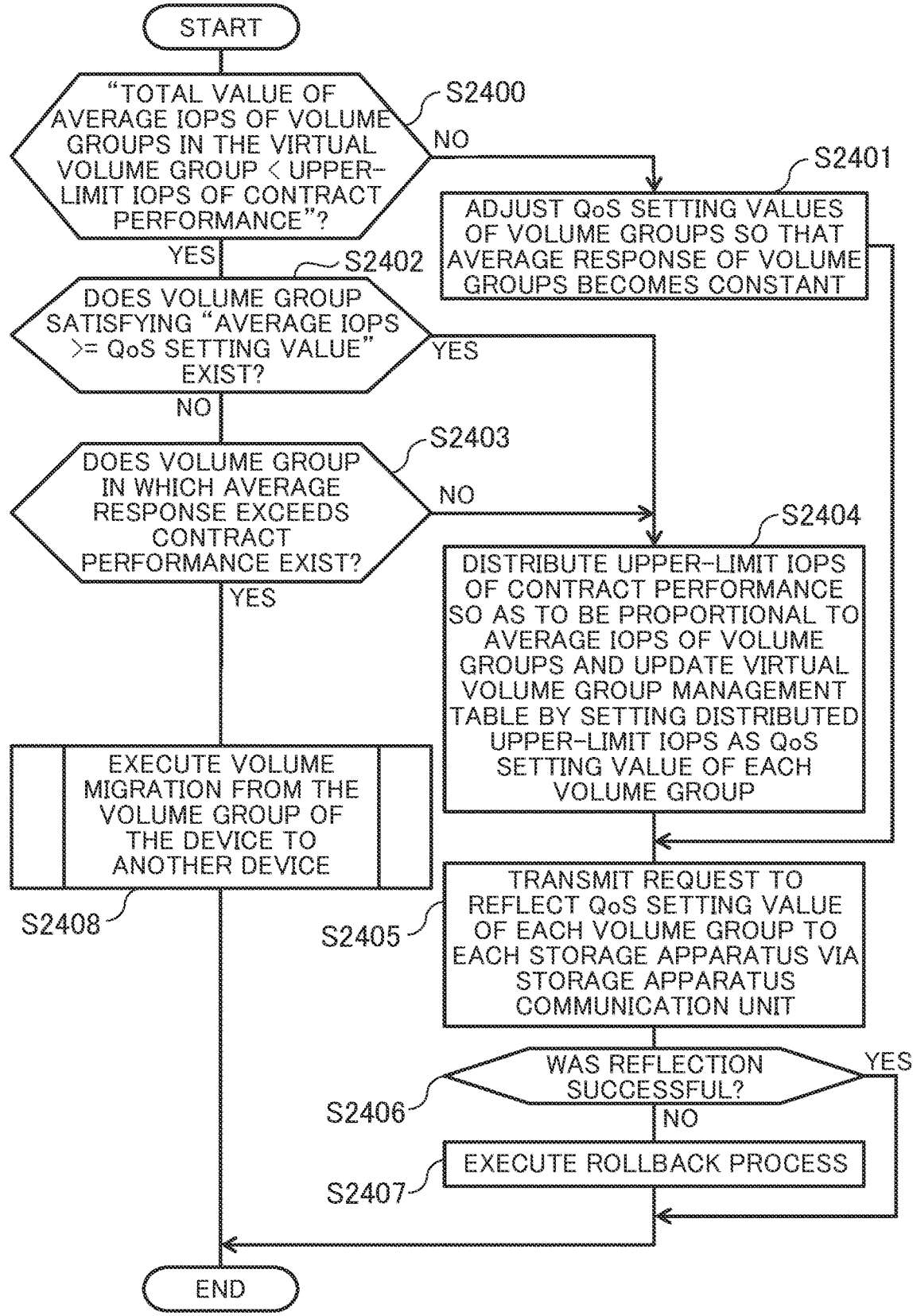

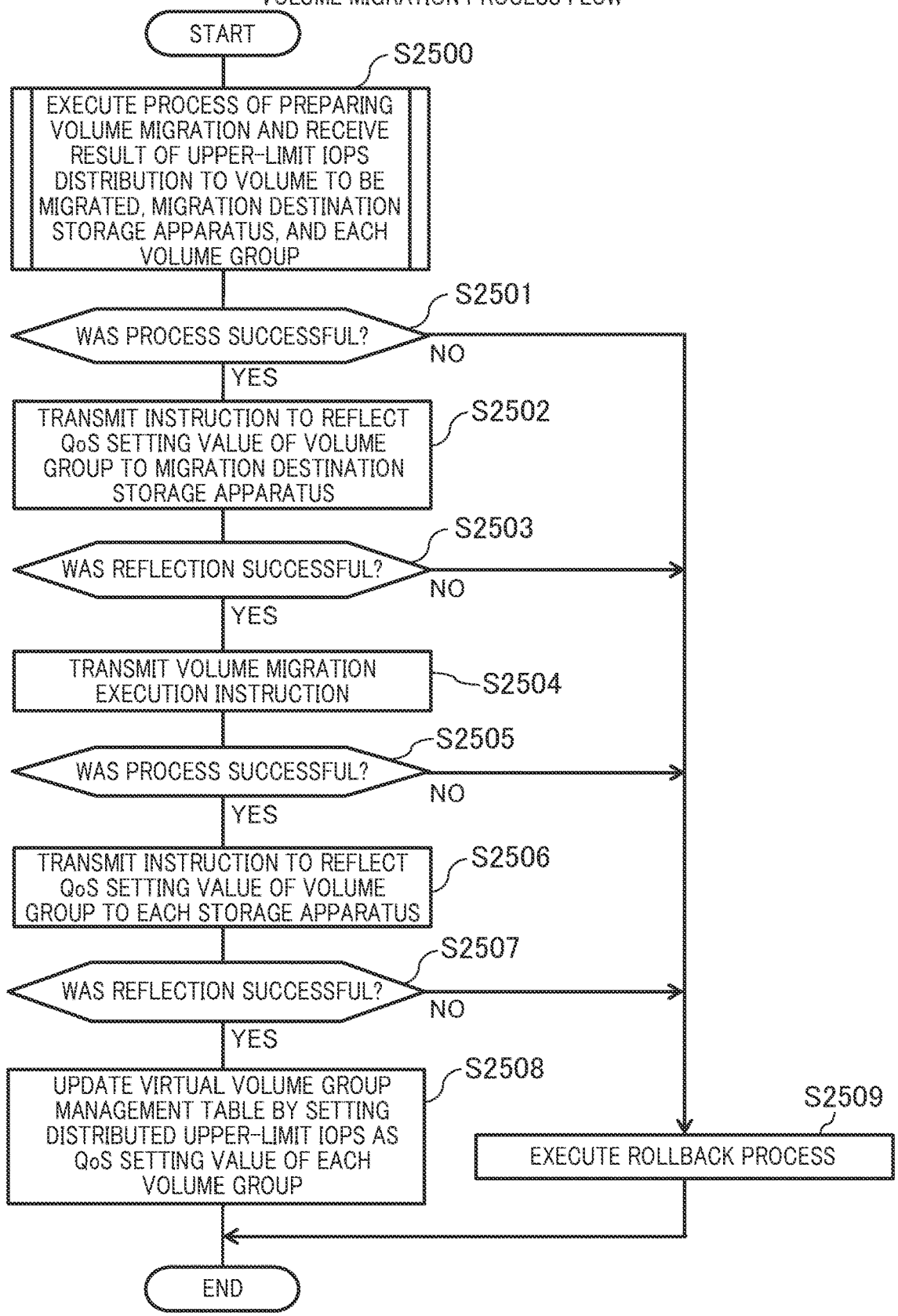

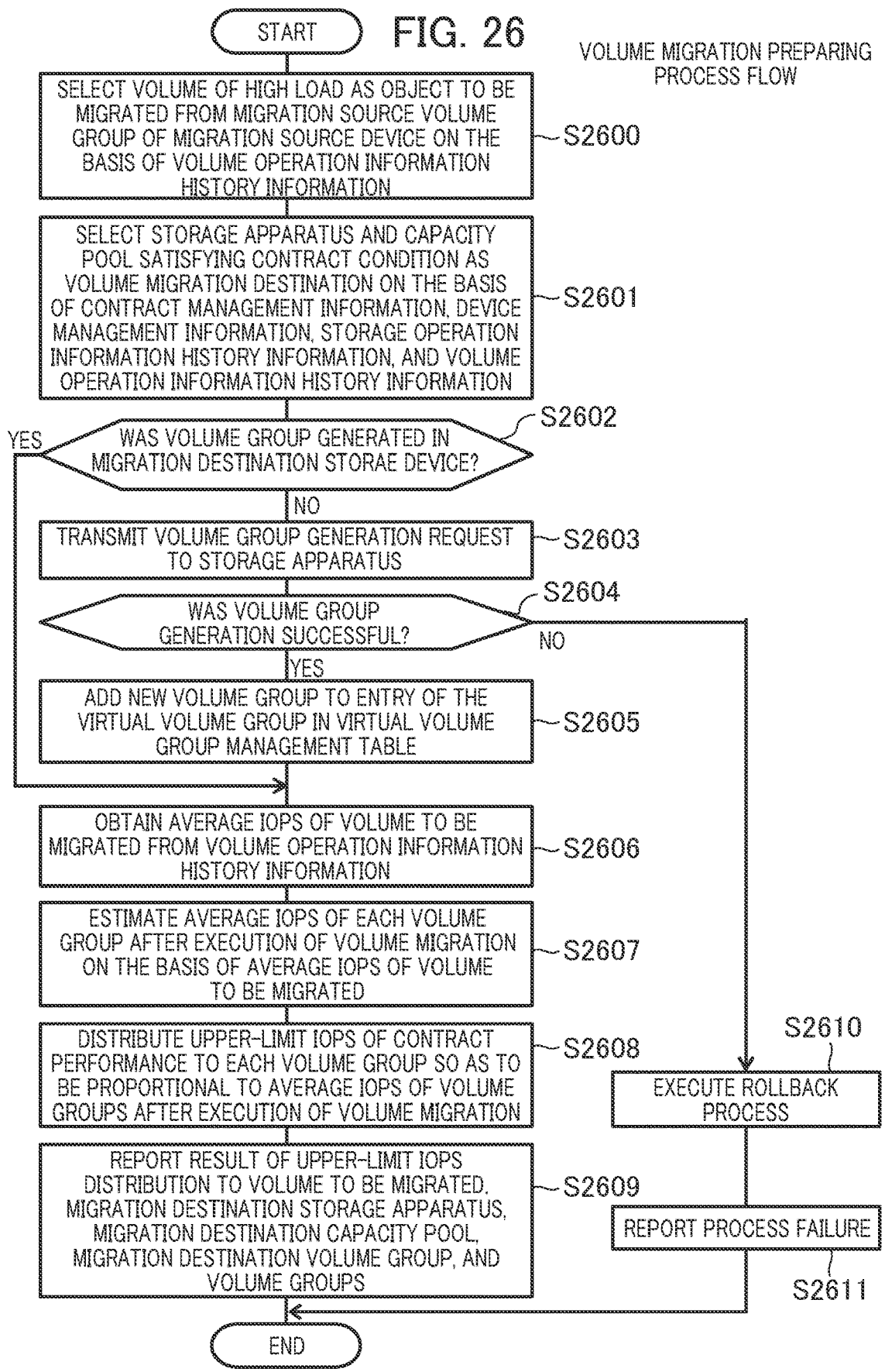

STORAGE SYSTEM AND QOS MANAGEMENT METHOD IN STORAGE SYSTEM

BACKGROUND

The present invention relates to a storage system and a QoS management method in a storage system.

In recent years, to reduce facility investment cost accompanying introduction of a storage apparatus, use of STaaS (Storage-as-a-Service) as storage service of a pay-per-use type is increasing. Customers using STaaS pay not for the purchase of a storage apparatus but pay a fee according to an actual amount use for storage service which inputs/outputs and holds data.

On the other hand, a storage vendor providing STaaS attempts to improve the use efficiency of a storage apparatus by accommodating customers as many as possible in a single storage apparatus (by multi-tenant use of a storage apparatus) in order to reduce the cost to provide the service.

In the case of sharing a single device by a plurality of customers as described above, generally, a technique of eliminating the influences among the customers is necessary. In a storage, in many cases, SLA (Service Level Agreement) with respect to IO processing ability (IOPS (Input Output Per Second)) and response time is made between the vendor and a customer. Even when a customer issues an excessive IO request, the IO has to be controlled so that the influence is limited to the customer and the SLAs of the other customers are not violated.

Some storage apparatuses in recent years have the QoS (Quality of Service) function. In the unit of a volume or a volume group bundling a plurality of volumes, target response time, the upper limit of the IOPS, and the like can be set. By setting the target response time and the upper limit of the IOPS according to the SLA by using the QoS function, the SLA can be guaranteed easily.

International Publication WO 2013-051056 discloses a technique of guaranteeing an SLA in a storage system constructed by a plurality of storage apparatuses. According to International Publication WO 2013-051056, in a storage system including a plurality of storage apparatuses and a management computer, the management computer manages a resource amount of a storage apparatus and a resource use amount assigned to an existing volume. When a request of deploying a new volume is received from a customer, whether or not a resource necessary to satisfy the SLA of the new volume can be assigned without violating the SLA of the existing volume is determined in advance, thereby preventing SLA violation due to resource shortage. By using the technique, the SLA can be guaranteed also in a storage system constructed by a plurality of storage apparatuses.

SUMMARY

The technique disclosed in International Publication WO 2013-051056 is a technique that a customer sets an SLA on the volume unit basis and the SLA is guaranteed. However, to set an SLA on the volume unit basis by a customer, the customer has to estimate a necessary service level on the volume unit basis. Concretely, a customer has to design the performance of a storage such as IOPS and estimation of response time to be satisfied required on the volume unit basis in accordance with upper-layer application requirements, upper-layer system requirements, and business requirements. Such performance design requires high expert knowledge regarding not only storage but also upper-layer application and the like and is not easily performed by a customer.

On the other hand, in the case of using the QoS function of a storage apparatus, by making the QoS setting on the volume group unit basis, the SLA can be guaranteed on the volume group unit basis. In an SLA on the volume group unit basis, it is sufficient for a customer to estimate IOPS and response time necessary for an entire application to be satisfied. Consequently, the degree of difficulty in the performance design becomes lower than that of an SLA on the volume unit basis, and the convenience of a customer becomes higher. However, the QoS function of a storage apparatus is a function of controlling the IO within the storage apparatus. When the storage apparatus increases to a plurality of storage apparatuses due to expansion of a storage system, there is no functionality of controlling the IO over the plurality of storage apparatuses. That is, guarantee of an SLA using the QoS function of a storage apparatus is limited to the only device itself, and scalability is low.

Hereinafter, it will be considered to solve a problem caused by no scalability by simply operating a plurality of storage apparatuses as a single storage system. When a customer attempts to deploy a volume exceeding the maximum storage capacity or IO processing ability of a single storage apparatus, since it exceeds the limit of a single device, an SLA cannot be guaranteed only by a single volume group. Consequently, by generating a volume group for each of a plurality of storage apparatuses and assigning a plurality of volume groups to one customer, the deploy request of the customer is met. However, in a volume group of each storage apparatus, each of the storage apparatuses independently controls the IO so as to satisfy the QoS setting of the volume group, so that the customer has to make the performance design to each of a plurality of volume groups. That is, due to lack of scalability, the convenience of the customer deteriorates.

In the above example, a pattern of exceeding the limit of a single storage apparatus only by a single volume group has been described. In reality, however, a plurality of volume groups by a plurality of customers may exist in a single storage apparatus. Consequently, a problem that a volume group which is not even a single large volume group is divided into a plurality of groups easily occurs. In addition, since the storage capacity or IOPS used by a volume group varies among volume groups, the storage capacity or IO processing ability of the entire storage apparatus cannot be used up, and a problem of fragmentation may occur. It causes deterioration in the use efficiency of a storage apparatus, and because a cause of increase in the operation cost of STaaS.

The present invention has been achieved in consideration of the above circumstances and an object of the invention is to provide a storage system realizing the QoS function in the unit of a virtual volume group existing over a plurality of storage apparatuses and a QoS management method in a storage system.

To solve the problem, a storage system according to an aspect of the present invention has a plurality of storage apparatuses each having a processor, providing a volume, and processing data which is input/output to/from the volume; a storage apparatus physically storing the data; and a management system managing the plurality of storage apparatuses. The management system forms a virtual volume group by using the plurality of volumes provided by the plurality of storage apparatuses, a QoS setting value including a data input/output amount is set for the virtual volume group, IO processing ability provided from each of the volumes to the virtual volume group is set so as to satisfy the QoS setting value, and the management system sets the IO processing ability provided from each of the volumes to the virtual volume group on the basis of operation information of each of the volumes.

According to the present invention, a storage system capable of realizing a QoS function in the unit of a virtual volume group existing over a plurality of storage apparatuses and a QoS management method in a storage system can be realized.

Objects, configurations, and effects other than the above-described ones will become apparent by the following description of embodiments.

BRIEF DESCRIPTION OF THE DRAWINGS

FIG. 6 is a diagram illustrating a configuration example of capacity pool control information in the storage system according to the embodiment.

FIG. 7 is a diagram illustrating a configuration example of volume control information in the storage system according to the embodiment.

FIG. 8 is a diagram illustrating a configuration example of a path management table in the storage system according to the embodiment.

FIG. 9 is a diagram illustrating a configuration example of volume group control information in the storage system according to the embodiment.

FIG. 11 is a diagram illustrating a configuration example of volume operation information in the storage system according to the embodiment.

FIG. 12 is a diagram illustrating a configuration example of contract management information in the storage system according to the embodiment.

FIG. 13 is a diagram illustrating a configuration example of device management information in the storage system according to the embodiment.

FIG. 14 is a diagram illustrating a configuration example of virtual volume group management information in the storage system according to the embodiment.

FIG. 15 is a diagram illustrating a configuration example of volume operation information history information in the storage system according to the embodiment.

FIG. 16 is a diagram illustrating a configuration example of storage apparatus information history information in the storage system according to the embodiment.

FIG. 23 is a diagram illustrating an example of an entire flow of QoS periodical adjustment process by a QoS periodical adjustment unit of the management system according to the embodiment.

FIG. 24 is a diagram illustrating an example of a QoS periodical adjustment process flow by the QoS periodical adjustment unit of the management system according to the embodiment.

FIG. 25 is a diagram illustrating an example of a process flow of volume migration by the QoS periodical adjustment unit of the management system according to the embodiment.

FIG. 26 is a diagram illustrating an example of a preparing process flow of volume migration by the QoS periodical adjustment unit of the management system according to the embodiment.

DETAILED DESCRIPTION

Figure 1:
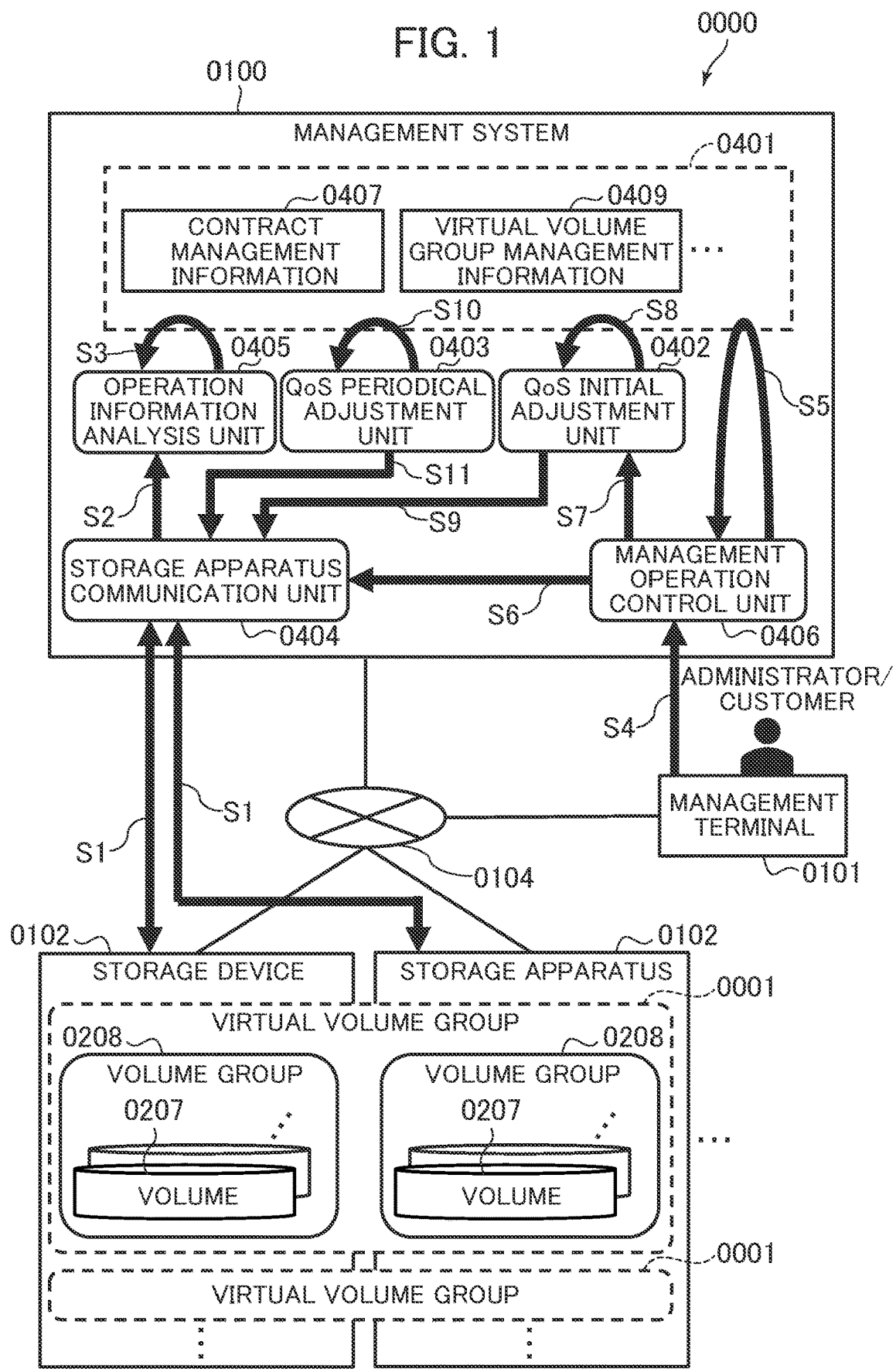
FIG. 1 is a diagram illustrating outline of a storage system according to an embodiment.

Hereinafter, an embodiment of the present invention will be described in detail with reference to the drawings. The following description and the drawings are an example for describing the present invention and properly omitted and simplified to make the explanation clear, and do not limit the technical scope of the present invention.

In the following description, various information will be described by expressions such as "table", "list", and "queue". However, the various information may be expressed by a data structure other than the above. Consequently, to indicate that the various information does not depend on the data structure, it may be also simply called "information". Although expressions such as "identification information", "identifier", "name", "ID", and "number" may be used at the time of explaining the content of the various information, they can be mutually replaced.

Hereinafter, there is a case that description will be made using "program" as a subject. However, since the program executes a process determined by a processor (for example, a CPU (Central Processing Unit) or a GPU (Graphics Processing Unit)) while properly using a storage resource (for example, a memory), an interface device (for example, a communication device), or the like, description may be made using a processor as a subject. Similarly, the subject of a process performed by executing a program may be, for example, a controller, a device, a system, a computer, a node, a storage apparatus, a server, a client, or a host having a processor. A part or the entire program may perform a process by using a hardware circuit.

Various programs may be installed in each computer by a program distributing server or a storage medium. In the following description, two or more programs may be realized as a single program or, on the contrary, one program may be realized as two or more programs.

In the drawings explaining the embodiment, the same reference numeral is designated to parts having the same function and repetitive description will be omitted.

In some cases, when elements of the same kind will not be distinguished in the following description, reference numeral (or common code in the reference numeral) will be used and, when elements of the same kind will be distinguished, identification number (or reference numeral) of the elements will be used.

The positions, sizes, shapes, ranges, and the like in the drawings are not always actual ones in order to facilitate understanding of the present invention. Consequently, the present invention is not always limited to the positions, sizes, shapes, ranges, and the like disclosed in the drawings.

A storage system of the embodiment has, as an example, the following configuration.

A storage system of the embodiment includes a plurality of storage apparatuses and a management system. In the storage system, a plurality of volume groups created in storage apparatuses are managed virtually as a single volume group as a virtual volume group, and a QoS function on the virtual volume group unit basis is realized. A customer makes performance design for the virtual volume group and sets an SLA and a QoS. The management system monitors operation information of actual volume groups constructing the virtual volume group and dynamically adjusts the QoS setting of each of the volume groups so as to satisfy the QoS setting for the virtual volume group set by the customer, and performs volume migration among the volume groups.

According to the embodiment, in the storage system constructed by the plurality of storage apparatuses, it is sufficient for the customer to make only the performance design to the single virtual volume group, so that the convenience in the STaaS use of the customer improves. Since one volume group is created virtually from a plurality of volume groups, the storage capacity and the IOPS of each of the storage apparatuses can be used without any waste, the use efficiency of the storage apparatuses can be increased and, moreover, the operation cost of the STaaS can be reduced.

Hereinafter, an embodiment of the present invention will be described in detail with reference to FIGS. 1 to 26.

First, referring to FIG. 1, outline of the embodiment of the present invention will be described. The details of components and processes will be specifically described later with reference to the other diagrams.

A storage system 0000 illustrated in FIG. 1 has a plurality of storage apparatuses 0102, a management system 0100, and a management terminal 0101. The storage apparatuses 0102, the management system 0100, and the management terminal 0101 are connected to a management network 0104.

Figure 2:
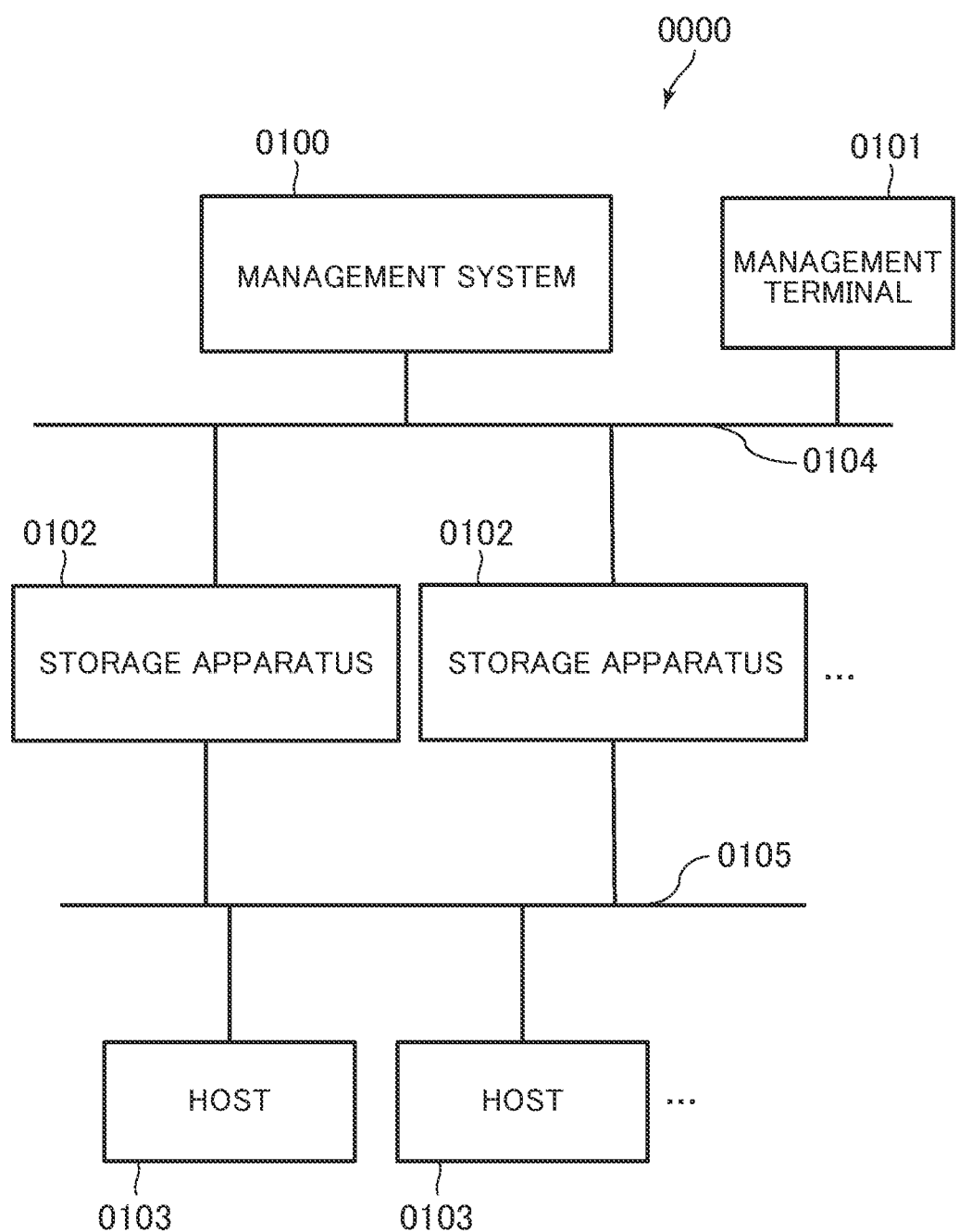
FIG. 2 is a diagram illustrating a configuration example of the storage system according to the embodiment.

The storage apparatus 0102 provides a logical storage area called a volume 0207 to a host 0103 (refer to FIG. 2). In the embodiment, the storage apparatus 0102 has a QoS function in the unit of a volume group 0208 obtained by grouping one or more volumes 0207, and the number of times of IO (IOPS=IO Per Second) which can be issued per unit time by the host 0103 to the storage apparatus 0102 can be limited on the volume group 0208 unit basis.

The management system 0100 is configured by an operation information analysis unit 0405, a storage apparatus communication unit 0404, a QoS periodical adjustment unit 0403, a QoS initial adjustment unit 0402, and a management operation control unit 0406 and, in addition, has contract management information 0407, virtual volume group management information 0409, and the like as management information 0401 used for various processes.

The management system 0100 manages the volume groups 0208 of the plurality of storage apparatuses 0102 by virtually bundling them as a virtual volume group 0001. By dynamically adjusting the QoS setting of each of the volume groups 0208 constructing the virtual volume group 0001, the QoS function on the virtual volume group 0001 unit basis is provided to an administrator of the storage system 0000 and a customer. Hereinafter, an example of realizing means of the QoS function on the virtual volume group 0001 unit basis will be described by steps S1 to S9.

Step S1 is a process of communication between the management system 0100 and the storage apparatuses 0102. As the details will be described later, since the management network 0104 may include not only a LAN (Local Area Network) in a data center but also a WAN (Wide Area Network) such as the Internet, a communication tunneling process or the like is performed for safe communication between the management system 0100 and the storage apparatuses 0102. The storage apparatus communication unit 0404 performs a termination process on the side of the management system 0100 in the tunneling. Consequently, all of communications with the storage apparatuses 0102 are performed basically through the storage apparatus communication unit 0404.

Step S2 is a process of instructing the operation information analysis unit 0405 to analyze the operation information received from the storage apparatus 0102 via the storage apparatus communication unit 0404. Step S3 is a process of performing shaping and aggregate calculation of data, denoising, downsampling, and various analyses to the operation information instructed in step S2 and storing the resultant information as management information into the management system 0100.

Step S4 is a process in which the administrator of the storage system 0000 or a customer instructs, via the management terminal 0101, the management operation control unit 0406 in the management system 0100 to deploy a new volume 0207. The management operation control unit 0406 performs a process of updating management information on the management system 0100 on the basis of the deploy instruction of the new volume 0207 received (step S5), a process of instructing the storage apparatus 0102 to deploy the new volume 0207 via the storage apparatus communication unit 0404 (step S6), and a process of instructing the QoS initial adjustment unit 0402 to perform the initial adjustment of QoS setting on the new volume 0207 (step S7). The QoS initial adjustment unit 0402 performs a process of adjusting the QoS setting of the new volume 0207 on the basis of the management information on the management system 0100 (step S8) and a process of reflecting an adjusted QoS setting value to the storage apparatus 0102 via the storage apparatus communication unit 0404 (step S9).

Step S10 is a process of adjusting the QoS setting of the existing volume 0207 by the QoS periodical adjustment unit 0403, which is executed periodically on the management system 0100. Step S11 is a process of reflecting a result of the adjustment of the QoS setting into the storage apparatus 0102 via the storage apparatus communication unit 0404.

By the processes as described above, the QoS function on the unit basis of the virtual volume group 0001 constructed by the plurality of volume groups 0208 by the plurality of storage apparatuses 0102 is realized.

FIG. 2 is a diagram illustrating a configuration example of the storage system 0000 in the embodiment. The storage system 0000 is constructed by one or more storage apparatuses 0102, one or more hosts 0103, one or more management terminals 0101, and the management system 0100.

The storage apparatuses 0102, the management system 0100, and the management terminal 0101 are connected via the management network 0104 and can perform communication mutually. The management network 0104 is realized by an arbitrary communication line such as an optical fiber, an LTE (Long Term Evolution), 5G (fifth generation mobile communication system), or a wireless LAN (Local Area Network) and a combination of any of the communication lines and may include not only a closed LAN (Local Area Network) in the data center but also a WAN (Wide Area Network) such as the Internet and a virtual network in a computer.

The management system 0100 is a system of assisting operation management of the storage apparatus 0102 by the administrator of the storage system 0000 by collecting operation information from the storage apparatuses 0102 and adjusting the settings of the storage apparatuses 0102 on the basis of the collected operation information, receiving an instruction from a customer via the management terminal 0101, and controlling the storage apparatuses 0102 on the basis of the instruction. Generally, the management system 0100 operates on the storage apparatus 0102 or a cloud prepared by a vendor which provides the STaaS. However, it is also possible to configure so that the management system 0100 operates on, for example, a private cloud prepared by the customer, an ordinary server device, or the like. A configuration of operating the management system 0100 in the storage apparatus 0102 may be also employed.

The management terminal 0101 is a device for giving an instruction to the storage system 0000 by the administrator of the storage system 0000 or a customer and is concretely a laptop computer, a tablet, a smartphone, or the like.

In the management terminal 0101, management software for managing the storage system 0000 is installed. The administrator of the storage system 0000 or a customer performs a communication with the management system 0100 via the management software to instruct a configuration change such as deployment of a new volume 0207, monitor whether the storage system 0000 and the storage apparatuses 0102 operate normally or not, and the like.

Although not particularly described in the embodiment, the management terminal 0101 may give an instruction to change the configuration directly to the storage apparatus 0102 and monitor the storage apparatus 0102.

The management software may be a Web application. In this case, the administrator of the storage system 0000 or customer performs various processes by accessing the Web application from a Web browser or the like installed in the management terminal 0101. The management system 0100 has the function of a Web server and distributes a program constructing management software to an access from the management terminal 0101.

The host 0103 is a computer for performing various business processes by executing an application program installed. In response to a request from the application program being executed, the host 0103 transmits a data read request or write request to the storage apparatus 0102.

As illustrated, the host 0103 is connected to the storage apparatus 0102 via a storage network 0105. The storage network 0105 is generally an SAN (Storage Area Network) using an FC (Fibre Channel) but may be a network configured by iSCSI, SRP (SCSI RDMA Protocol), NVMeoF (Non-Volatile Memory Express over Fabrics), or the like using the Ethernet, InfiniBand, or the like.

The storage apparatus 0102 is a device providing a storage area for writing/reading data to/from the host 0103. The storage apparatus 0102 is connected to the management system 0100 and the management terminal 0101 via the management network 0104 and connected to the host 0103 via the storage network 0105.

Figure 3:
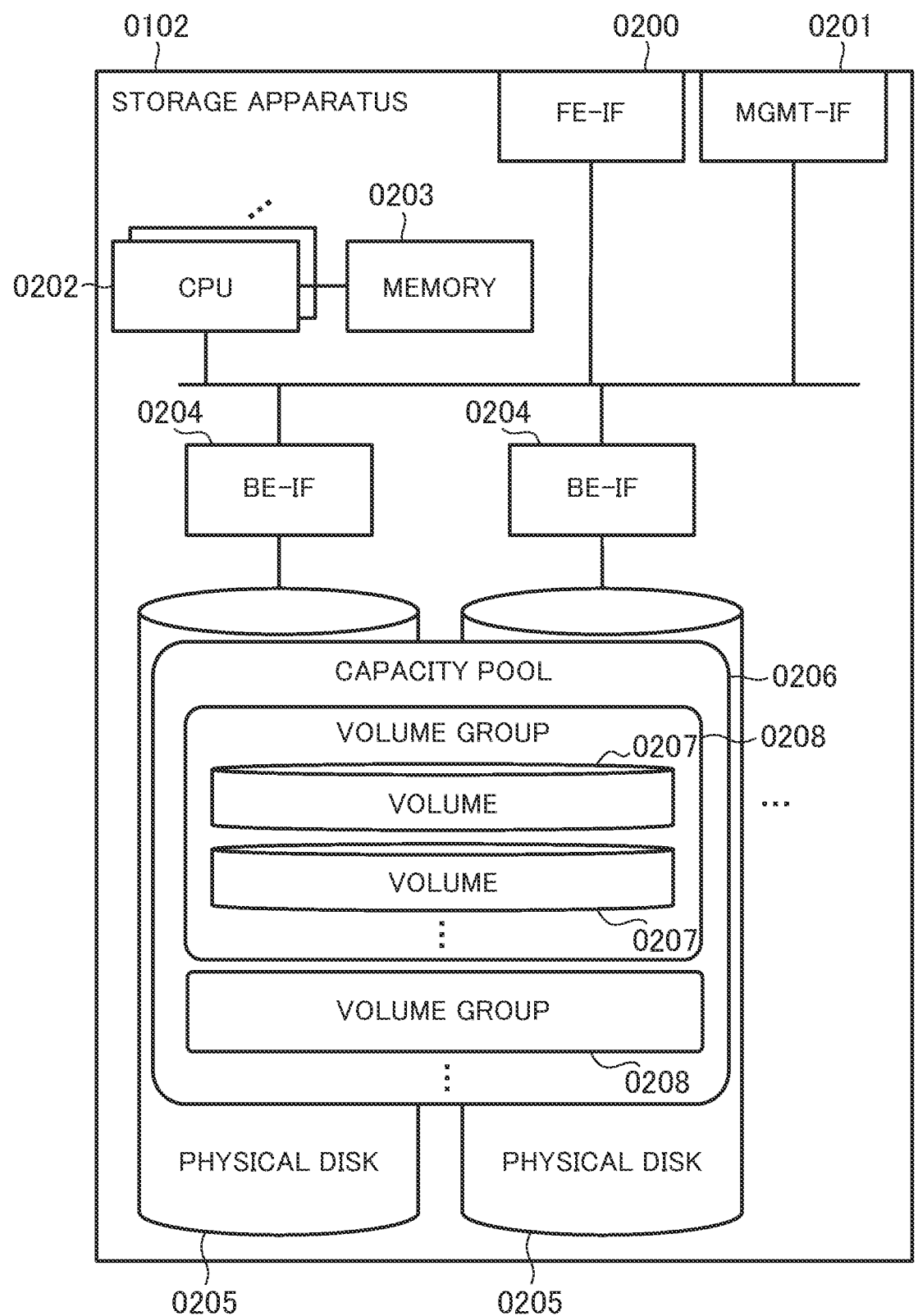
FIG. 3 is a diagram illustrating a configuration example of a storage apparatus in the storage system according to the embodiment.

FIG. 3 is a diagram illustrating a configuration example of the storage apparatus 0102 in the embodiment. The storage apparatus 0102 is a device providing a storage area for writing/reading data to/from the host 0103. The storage apparatus 0102 is constructed by one or more CPUs 0202, one or more memories 0203, one or more FE-IFs (Frontend Interfaces) 0200, one or more MGMT-IFs (Management Interfaces) 0201, one or more BE-IFs (Backend Interfaces) 0204, and one or more physical disks 0205 which are connected via a bus in the storage apparatus 0102. The CPU 0202 is a control device performing operation control on the storage apparatus 0102 and executes various processes by executing various programs stored in the memory 0203.

The memory 0203 stores, for example, in addition to the above-described various programs and control information necessary to execute the various processes, operation information such as CPU usage ratio and IO amount. Generally, the memory 0203 is constructed by a DRAM (Dynamic RAM (Random Access Memory)) and is connected by using an SDRAM (Synchronous DRAM) or a successor memory standard. For example, the memory 0203 may be configured by using a storage medium such as an MRAM (Magnetoresistive RAM), ReRAM (Resistive RAM), or a PCM (Phase Change Memory).

The FE-IF 0200 is a network interface for connection to the host 0103 via the above-described storage network 0105 and has a network interface according to the communication standard of the storage network 0105. Although the PCI express is generally used for connection between the CPU 0202 and the FE-IF 0200, another communication standard may be also used.

The MGMT-IF 0201 is a network interface for connecting the management system 0100 and the management terminal 0102 via the above-described management network 0104 and has a network interface according to the communication standard of the management network 0104. Although the PCI express is generally used for connection between the CPU 0202 and the MGMT-IF 0201, another communication standard may be also used.

The physical disk 0205 is a device having a physical storage area and is configured by, for example, a nonvolatile storage device such as an HDD (Hard Disk Drive), an SSD (Solid State Drive), an SCM (Storage Class Memory), or an optical disk and is connected to the BE-IF 0204 by an interface such as SAS (Serial Attached SCSI), SATA (Serial ATA), or NVMe (Non-Volatile Memory express). Although not illustrated, a configuration that a plurality of BE-IFs 0204 are connected to one physical disk 0205 or, on the contrary, a configuration that a plurality of physical disks 0205 are connected to one BE-IF 0204 may be employed. Although the PCI Express is generally used to connect the CPU 0202 and the BE-IF 0204, a configuration using another communication standard may be also employed.

In the storage apparatus 0102, by logically bundling one or more physical disks 0205, one or more capacity pools 0206 are configured. As the technique of bundling the physical disks 0205, JBOD (Just a Bunch Of Disks) of simply coupling storage areas of the physical disks 0205 or a highly reliable technique such as RAID (Redundant Arrays of Independent Disks) may be also used.

In the storage apparatus 0102, one or more volumes 0207 are formed by cutting out a part of the storage area from the capacity pool 0206. The volume 0207 is a storage area provided for the host 0103 by the storage apparatus 0102, and data written by the host 0103 is stored in the volume 0207. The volume 0207 itself does not have a physical storage area. Data written by the host 0103 into the volume 0207 is written in the drive via the capacity pool 0206.

The volume group 0208 is a kind of a management unit of the volume 0207 configured by one or more volumes 0207. In the embodiment, the storage apparatus 0102 has the QoS function on the volume group 0208 unit basis, and the number of times of IO (IOPS=IO Per Second) which can be issued to the storage apparatus 0102 by the host 0103 per unit time can be limited on the volume group 0208 unit basis.

Although the details will be omitted, in the data input/output processes, a thin provisioning function of assigning a physical storage area only to an area in which IO is generated, a data compressing function of compressing data written from the host 0103 and storing the compressed data into the drive, an overlap eliminating function of detecting and eliminating data overlapped in the storage apparatus 0102, and the like may be provided.

Since the process of the storage apparatus 0102 when a data write request or read request is sent from the host 0103 is not related to the essential part of the present invention, more detailed description will be omitted. Also in the following description, unless otherwise described, the process flow and the data structure related to the data input/output process will be omitted, but it is assumed that the process can be properly performed.

In addition, although not illustrated, a nonvolatile storage device for storing an OS (Operating System) image, an operation log, and the like of the storage apparatus 0102, for example, an HDD, an SSD, or an eMMC (embedded Multi Media Card) may be also provided.

Each of the host 0103 and the storage apparatus 0102 may not always be a physical component but may be configured by using a virtualization technique such as a virtual machine or a container. In addition, another configuration may be employed that, by using any of those virtualization techniques, the host 0103 and the storage apparatus 0102 virtualized are allowed to exist in one physical device, and a virtual switch is used as the storage network 0106.

Figure 4:
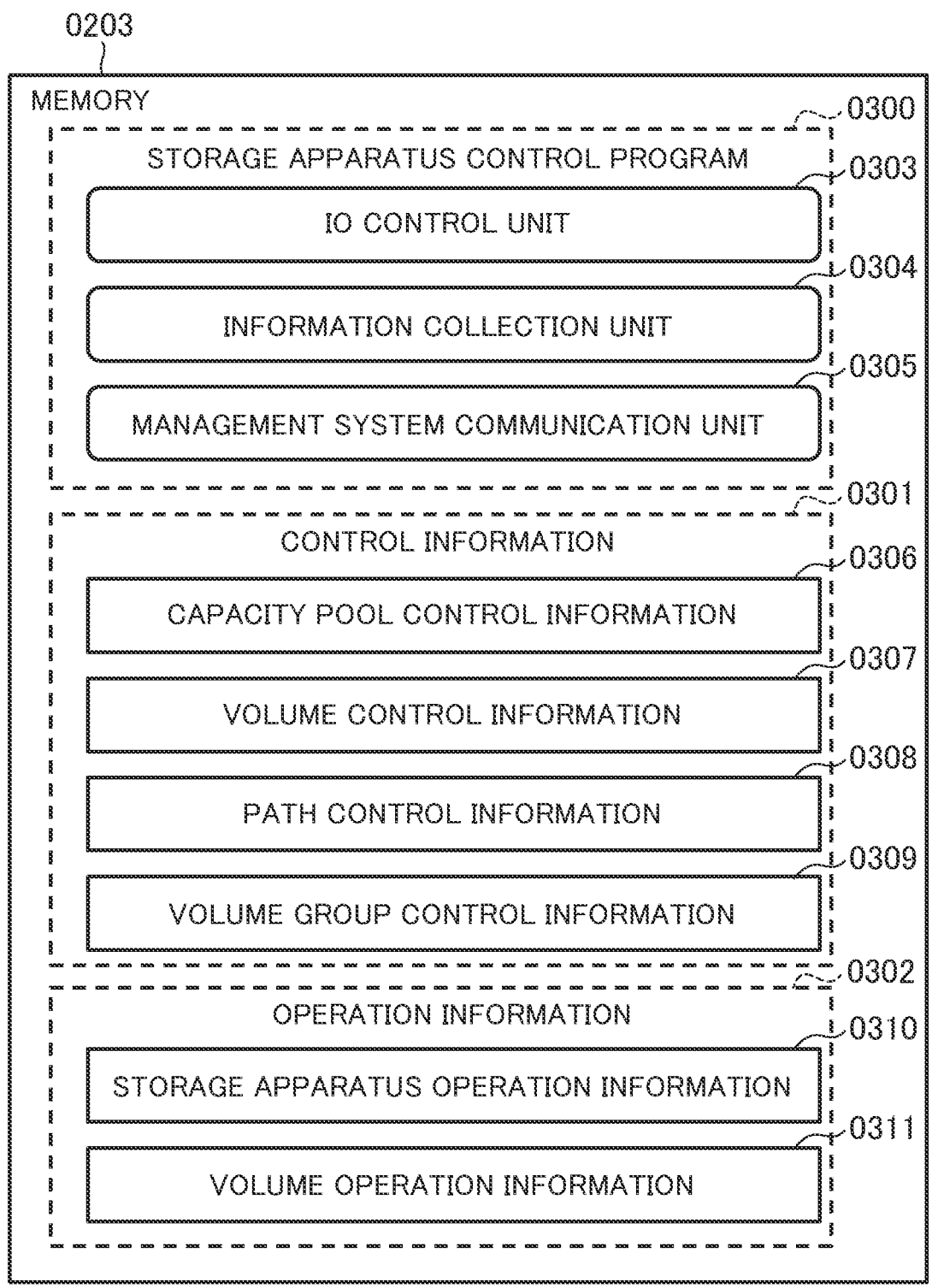
FIG. 4 is a diagram illustrating a memory configuration example of the storage apparatus in the storage system according to the embodiment.

FIG. 4 illustrates a storage apparatus control program 0300, control information 0301, and operation information 0302 stored in the memory 0203 of the storage apparatus 0102. The storage apparatus control program 0300 is executed by the CPU 0202 of the storage apparatus 0102 and, according to a process, refers to or updates the control information 0301 and the operation information 0302. Although a storage apparatus control program 0300, control information 0301, and operation information 0302 other than those illustrated and, further, a part of data read/written by the host 0103 such as cache and the like can be also stored in reality, only the information and the like related to the embodiment is illustrated.

An IO control unit 0303 is a program for providing the volume 0207 to the host 0103 and processing a data input request to the volume 0207. The IO control unit 0303 performs deployment of a new volume 0207, creation of a group of new volumes 0207, change of the QoS setting value of the volume group 0208, and the like in accordance with an operation instruction of the storage apparatus 0102 received from the management system 0100 via a management system communication unit 0305. Further, in the case of receiving an instruction of volume migration among the storage apparatuses 0102, the IO control unit 0303 executes a process such as transfer of data stored in the volume 0207 and the control information 0301 from a storage apparatus 0102 as a migration source to a storage apparatus 0102 as a migration destination via the storage network 0105 and the management network 0104. In addition, the IO control unit 0303 also realizes a process of constructing the capacity pool 0206 by bundling a plurality of physical disks 0205 and a process of constructing the volume 0207 from the capacity pool 0206 described by referring to FIG. 3. The IO control unit 0303 refers to or updates the control information 0301 as necessary during execution of those processes.

An information collection unit 0304 is a program of monitoring an operation situation by the IO control unit 0303 and stores a result of periodical monitoring in the operation information 0302. In addition, the information collection unit 0304 transmits the operation information 0302 to the management system 0100 via the management system communication unit 0305.

The management system communication unit 0305 is a program for the storage apparatus 0102 to communicate with the management system 0100. In the embodiment, it is assumed that the management system 0100 is configured in cloud, and a communication path which is not safe such as the Internet is used as the management network 0104. A case is also assumed that the communication direction is limited to one direction from the storage apparatus 0102 to the management system 0100 by the firewall of the data center depending on the environment. Consequently, the management system communication unit 0305 performs, as necessary, tunneling of communication by a technique such as encryption or VPN (Virtual Private Network) to establish a communication path between the management system 0100 and the storage apparatus 0102. When an instruction is received from the management system 0100, the management system communication unit 0305 initiates a proper program or relays the instruction to a program already initiated in accordance with the instruction. For example, when an instruction to deploy a new volume 0207 is received, the management system communication unit 0305 relays a creation request to the IO control unit 0303.

The control information 0301 is configured by capacity pool control information 0306, volume control information 0307, path control information 0308, and volume group control information 0309.

The capacity pool control information 0306 is control information related to the capacity pool 0206 and is made by the capacity of the capacity pool 0206, information of a drive constructing the capacity pool 0206, and the like. The volume control information 0307 is control information related to the volume 0207 and is made by information of the capacity pool 0206 in which data of the volume 0207 is stored and information such as the capacity of the volume 0207. The path control information 0308 is control information related to connection between the host 0103 and a volume 0207 and is made by information of the WWN, LUN, or the like of the host 0103 connected to the volume 0207. The volume group control information 0309 is control information related to the QoS function on the volume group 0208 unit basis and is made by information of the volumes 0207 constructing a volume group 0208 and information such as a QoS setting value of the volume group 0208.

The operation information 0302 is made by storage apparatus operation information 0310 and volume operation information 0311. The storage apparatus operation information 0310 is operation information related to the entire storage apparatus 0102, and information such as CPU usage ratio and memory usage ratio is stored. The volume operation information 0311 is operation information related to a volume 0207, and information such as average IOPS, average transfer rate, and average response of the volume 0207 is stored.

Although not illustrated, the memory 0203 may hold, in addition to the above, operation information of the host 0103 and each of components of the storage apparatus 0102 such as the physical disk 0205, the FE-IF, the BE-IF, and the management-IF, information to be used for communication between the management system 0100 and the storage apparatus 0102, and the like.

Figure 5:
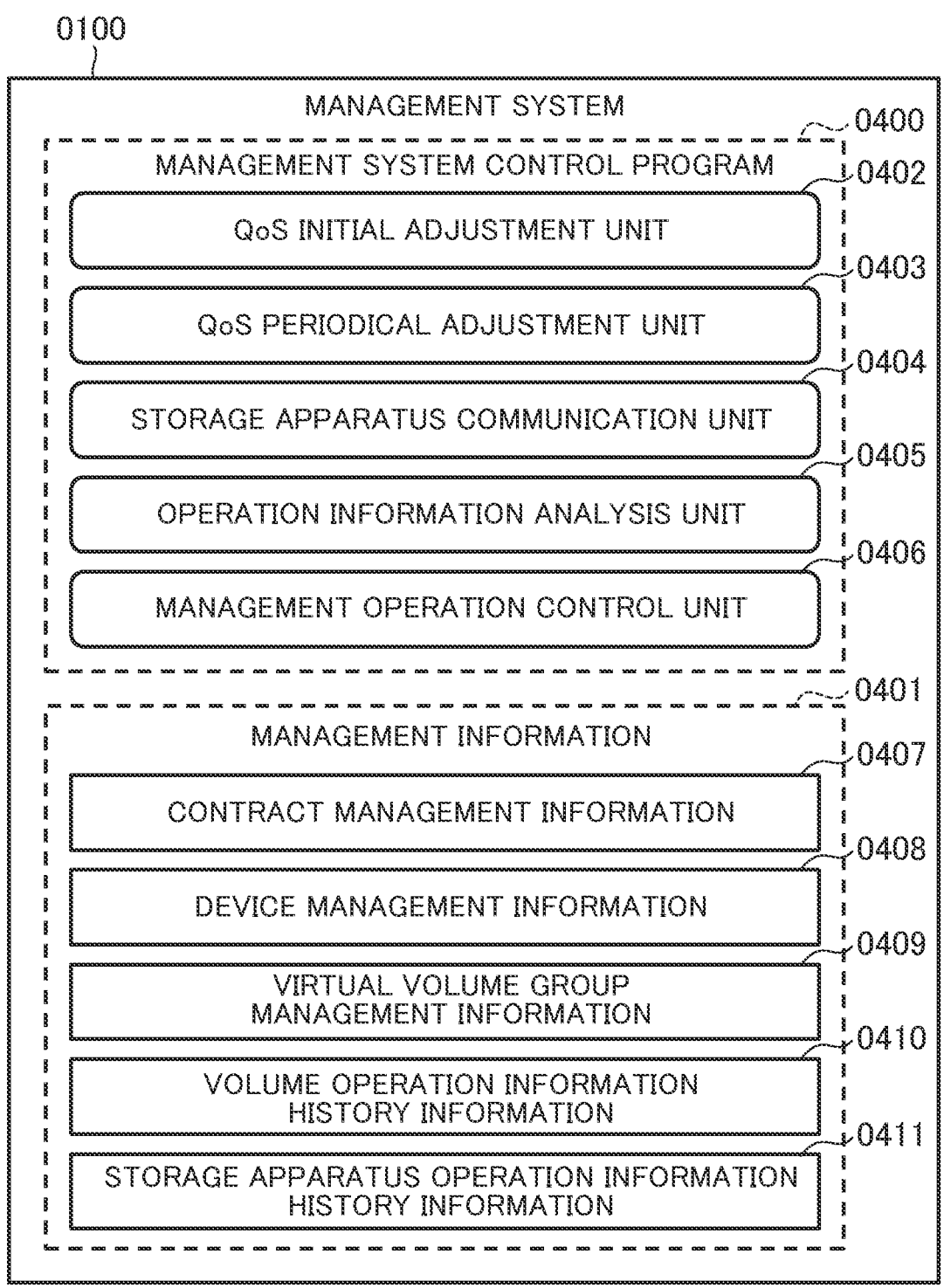
FIG. 5 is a diagram illustrating a configuration example of a management system in the storage system according to the embodiment.

FIG. 5 is a diagram illustrating the configuration of the management system 0100. The management system 0100 operates on any computer in the storage apparatus 0102 or a cloud prepared by a vendor providing the STaaS. The computer is not limited to a physical server but may be a virtual machine or a container. Further, the management system 0100 may be configured by using service which executes a program without consciousness of computing environment provided by a cloud vendor, such as FaaS (Function-as-a-Service) or serverless computing.

The management system 0100 is constructed by various control programs 0400 and various management information 0401. Although not illustrated, in addition, an interface connected to the management network 0104 and communicating with the management terminal 0101 and the storage apparatus 0102 is provided. The control program 0400 is held by a storage device on the management system 0100 and is executed using communication from the management terminal 0101 or the storage apparatus 0102, time, or the like as a trigger. The management information 0401 is held by a storage device on the management system 0100, and a control program writes/reads information as necessary.

The QoS initial adjustment unit 0402 is a program for adjusting a QoS setting value to the volume group 0208 including a volume 0207 newly deployed. The QoS initial adjustment unit 0402 is called from the management operation control unit 0406 and executed. Since the operation information 0302 does not exist in the newly deployed volume 0207, the QoS initial adjusting unit 0402 adjusts the QoS setting value at the time of deploying the new volume 0207. After that, reflection into the adjusted QoS setting value is instructed to the storage apparatus 0102 via the storage apparatus communication unit 0404.

The QoS periodical adjustment unit 0403 is a program for periodically adjusting the QoS setting value of the existing volume group 0208. The QoS periodical adjustment unit 0403 is periodically executed using present time as an execution trigger and adjusts the QoS setting value of each volume group 0208. After that, reflection to the adjusted QoS setting value is instructed to the storage apparatus 0102 via the storage apparatus communication unit 0404.

The storage apparatus communication unit 0404 is a program for the management system 0100 to communication with the storage apparatus 0102 like the management system communication unit 0305 in the storage apparatus 0102, as necessary, performs communication tunneling by a technique such as encryption or VPN (Virtual Private Network), and establishes a communication path between the management system 0100 and the storage apparatus 0102. When any information is received from the storage apparatus 0102, the storage apparatus communication unit 0404 initiates a proper program or relays the information to an initiated program in accordance with the kind of the information. For example, when the operation information 0302 of the storage apparatus 0102 is received, the storage apparatus communication unit 0404 initiates the operation information analysis unit 0405 to instruct analysis of the received operation information.

The operation information analysis unit 0405 is a program of performing various analyses such as data shaping and aggregate calculation to the operation information 0302 received from the storage apparatus 0102 and, on the basis of the result, updating the management information 0401.

The management operation control unit 0406 is a program of controlling the storage apparatus 0102 in accordance with a storage operation instruction received from the management terminal 0101 via the management network 0104. Control of the storage apparatus 0102 is realized by giving an operation instruction to the storage apparatus 0102 via the storage apparatus communication unit 0404. At this time, as necessary, the management information 0401 is referred to or updated. Depending on the content of the operation, another program is initiated and the process is carried over to the initiated program.

The management information 0401 is information for the management system 0100 to manage the storage apparatus 0102 and is configured by the contract management information 0407, device management information 0408, the virtual volume group management information 0409, volume operation information history information 0410, and storage apparatus operation information history information 0411.

The contract management information 0407 is made by information related to an SLA with a customer such as contract capacity, contract performance, and RAID level. The device management information 0408 is made by information for managing the storage apparatus 0102 such as the operation information of the storage apparatus 0102, total capacity and used capacity of each capacity pool 0206, RAID level, and the like. The virtual volume group management information 0409 is made by information for managing the virtual volume group 0001 such as the usage capacity and operation information of the volume groups 0208 constructing the virtual volume group 0001, the QoS setting value, and the like. The volume operation information history information 0410 is made by time-series history of operation information by the volumes 0207. The storage apparatus operation information history information 0411 is made by time-series history of operation information by the storage apparatuses 0102.

Although not illustrated, in addition, a customer or the administrator of the storage system 0000 may hold information related to authentication and approval for logging in the management system 0100, information used for communication between the management system 0100 and the storage apparatus 0102, and the like.

Hereinafter, various information for controlling the storage system 0000 in the embodiment will be described.

FIG. 6 is a diagram illustrating information held in the capacity pool control information 0306. The capacity pool control information 0306 has capacity of the capacity pool 0206 and information of the drive constructing the capacity pool 0206. Each of entries of the capacity pool control information 0306 includes capacity pool ID 0500, total capacity 0501, used capacity 0502, physical disk ID 0503, and RAID level 0504.

The capacity pool ID 0500 is an ID for uniquely identifying the capacity pool 0206 in the storage apparatus 0102. Although serial numbers are indicated in the diagram, an ID is not limited to serial numbers but may be characters other than numbers. The total capacity 0501 is information indicating the capacity of data which can be stored in the capacity pool 0206. The used capacity 0502 is information indicating capacity of data stored in the capacity pool 0206. The physical disk ID 0503 is information indicating the physical disk 0205 constructing the capacity pool 0206. Although numbers are used in the diagram, a character string such as an address indicating the position of the physical disk 0205 on the bus may be set as an ID. The RAID level 0504 is information indicating a method used for bundling the physical disks 0205 constructing the capacity pool 0206. RAID6 and RAID5 in the diagram are a kind of the above-described technique for realizing high reliability and differ in fault tolerance.

The example of the diagram illustrates that, in the capacity pool 0206 whose capacity pool ID 0500 is "0", the physical disk IDs 0503 "0, 1, 2, 3, and 4" are bundled by RAID6, and "30 TB" out of "100 TB" as the total capacity 0501 is used.

At the time of introducing a new storage apparatus 0102, according to a hardware configuration or the like of the storage apparatus 0102, the administrator of the storage system 0000 adds an entry in the capacity pool control information 0306. With respect to the used capacity 0502, when the IO control unit 0303 deploys a new volume 0207, the capacity of the volume 0207 is added.

FIG. 7 is a diagram illustrating information held in the volume control information 0307. The volume control information 0307 is control information related to the volume 0207 and is information of the capacity pool 0206 in which data of the volume 0207 is stored and information such as capacity of the volume 0207. Each of entries in the volume control information 0307 includes volume ID 0600, capacity pool ID 0601, and capacity 0602.

The volume ID 0600 is ID for uniquely identifying a volume 0207 in the storage apparatus 0102. Although serial numbers are used in the diagram, an ID is not limited to serial numbers but may be characters other than numbers. The capacity pool ID 0601 is information indicating a capacity pool 0206 to which data of the volume 0207 is stored. The capacity 0602 is information indicating a data amount which can be stored in the volume 0207.

The example of the diagram illustrates that, in the volume 0207 whose volume ID 0600 is "0", data is stored in the capacity pool 0206 whose capacity pool ID 0601 is "0", and data of "100 GB" can be stored.

In the volume control information 0307, when the IO control unit 0303 receives a request to deploy a new volume 0207, an entry is added according to the configuration of the volume 0207 to be deployed.

FIG. 8 is a diagram illustrating information held in the path control information 0308. The path control information 0308 is control information related to connection between the host 0103 and a volume 0207 and indicates information such as WWN, LUN, and the like of the host 0103 connected to the volume 0207. Each of entries of the path control information 0308 includes volume ID 0700, host WWN 0701, and LUN 0702.

The host WWN 0701 is identification information unique to an HBA (Host Bus Adapter) of the host 0103 and is information used by the storage apparatus 0102 to communicate with the host 0103. The host WWN 0701 illustrated in the diagram is information used mainly with the host 0301 and an FC protocol. In the case adapted to another protocol, information indicating the protocol and information necessary for a communication in the protocol is stored. The LUN (Logical Unit Number) 0702 is identification information used to identify each of volumes 0207 when a plurality of volumes 0207 are assigned to one host 0103.

The example of the diagram indicates that a volume 0207 whose volume ID 0700 is "0" is connected to the host 0103 having an HBA whose WWN 0701 is "0011223344556677", and the LUN 0702 of the volume 0207 is "0".

When the IO control unit 0303 receives a request to deploy a new volume 0207 or a path registration request, an entry is added to the path control information 0308 on the basis of the request.

FIG. 9 is a diagram illustrating information held in the volume group control information 0309. The volume control information 0307 is control information related to a volume 0207 and indicates information of the capacity pool 0206 in which data of the volume 0207 is stored and information such as capacity of the volume 0207. Each of entries in the volume control information 0307 includes volume group ID 0800, QoS setting 0801, and volume ID 0802.

The volume group ID 0800 is an ID for uniquely identifying a volume group 0208 in the storage apparatus 0102. Although serial numbers are used in the diagram, an ID is not limited to serial numbers but may be characters other than numbers. The QoS setting 0801 is information indicating the upper limit of an IO amount (IOPS) which can be issued per unit time by the host 0103 to the volume group 0208.

The example of the diagram illustrates that the volume group 0208 whose volume group ID 0800 is "0" is constructed by volumes whose volume IDs 0802 are "0" and "1" and an IO of the maximum "6×IOPS" in total can be issued to those volumes 0207.

In the volume group control information 0309, when the IO control unit 0303 receives a request to create a new volume 0207, an entry is added. At the time of deploying a new volume 0207 or execution of volume migration, a volume ID 0802 as a component is added or deleted. At the time of receiving a request of reflecting the QoS setting, the QoS setting 0801 is updated according to the received setting value.

Figure 10:
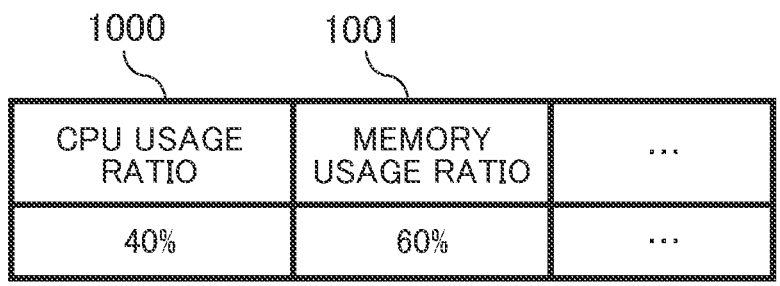
FIG. 10 is a diagram illustrating a configuration example of storage apparatus operation information in the storage system according to the embodiment.

FIG. 10 is a diagram illustrating information held in the storage apparatus operation information 0310. The storage apparatus operation information 0310 is operation information related to the entire storage apparatus 0102 and indicates information such as CPU usage ratio and memory usage ratio. The storage apparatus operation information 0310 includes CPU usage ratio 1000 and memory usage ratio 1001.

The CPU usage ratio 1000 is a ratio of time in which the CPU 0202 constructing the storage apparatus 0102 executes a process per unit time. The memory usage ratio 1001 is a ratio of capacity used to store any data in the capacity of the memory 0203 constructing the storage apparatus 0102.

The example of the diagram illustrates that the CPU usage ratio 1000 is "40%" and the memory usage ratio 1001 is "60%".

In the storage apparatus operation information 0310, the information collection unit 0304 monitors the IO control unit 0303 and periodically updates the CPU usage ratio 1000 and the memory usage ratio 1001.

FIG. 11 is a diagram illustrating information held in the volume operation information 0311. The volume operation information 0311 is operation information related to a volume 0207 and indicates information such as the average IOPS, the average transfer rate, and the average response of the volume 0207. Each of entries in the volume operation information 0311 includes volume ID 0900, average IOPS 0901, average transfer rate 0902, and average response 0903.

The average IOPS 0901 is an average of the number of IOs (IOPS) issued per unit time by the host 0103 to the volume 0207. The average transfer rate 0902 is an average of a data amount transferred by IO issued per unit time by the host 0103 to the volume 0207. The average response 0903 is an average of time required for the storage apparatus 0102 to send a response to the IO issued in the unit time from the host 0103 to the volume 0207.

The example of the diagram illustrates that the volume 0207 whose volume ID 0900 is "0" receives IOs of "3 k IOPS" at "12 MB/2" in average from the host 01003 and requires time of "0.5 ms" to send a response to those IOs in average.

In the volume operation information 0311, the information collection unit 0304 monitors the IO control unit 0303 and periodically updates the average IOPS 0901, the average transfer rate 0902, and the average response 0903 on the volume 0207 unit basis.

FIG. 12 is a diagram illustrating information held in the contract management information 0407. The contract management information 0407 is information related to SLA with a customer, such as contract capacity, contract performance, and RAID level. Each entry in the contract management information 0407 includes customer ID 1100, virtual volume group ID 1101, contract capacity 1102, contract performance 1103, and contract RAID level 1104.

The customer ID 1100 is an ID for uniquely identifying a customer using the storage system 0000. Although serial numbers are used in the diagram, an ID is not limited to serial numbers but may be characters other than numbers. For example, a mail address of a customer may be used as an ID. A customer in the contract management information 0407 may be an organization. In this case, it is sufficient to prepare information managing a correspondence relation between the organization and the user.

The virtual volume group ID 1101 is an ID used by the management system 0100 to uniquely identify the virtual volume group 0001. Although serial numbers are used in the diagram, an ID is not limited to serial numbers but may be characters other than numbers. Two or more virtual volume groups 0001 may be assigned to one customer. It means that a customer having two or more virtual volume groups 0001 has a plurality of contracts. Such a form may be taken, for example, in the case that a real environment and a development environment are desired to be separated or the case of using the storage system 0000 in a plurality of independent purposes. At the time of deploying a new volume 0207, a customer having two or more virtual volume groups 0001 can select a virtual volume group 0001 to which the volume 0207 is to be deployed.

The contract capacity 1102 is maximum capacity which can be used in the virtual volume group 0001 by the customer. The customer can deploy a new volume 0207 until the total of the capacity of the volume 0207 reaches the contract capacity 1102 for the virtual volume group 0001.

The contract performance 1103 is SLA for the IO performance requested to the virtual volume group 0001 by the customer. In the embodiment, the SLA for the IO performance includes upper-limit IOPS and average response. The upper-limit IOPS indicates the maximum number of IOs the customer can issue per unit time to the volume 0207 constructing the virtual volume group 0001. The average response is an average of time required for the storage apparatus 0102 to respond to IOs issued by the customer in unit time to the volume 0207 constructing the virtual volume group 0001.

The contract RAID level 1104 is an SLA regarding a RAID level required by the customer for the virtual volume group 0001. In addition to the SLA for the IO performance such as contract performance, there are SLAB for fault tolerance and availability. The contract RAID level 1104 is a kind of an SLA related to fault tolerance and an example of an SLA related other than the IO performance.

In the embodiment, the contract RAID level 1104 is not essential, and there may be an SLA other than the contract RAID level 1104. For example, RPO (Recovery Point Objective), RTO (Recovery Time Objective) or the like as an index related to recovery when data is lost due to a hardware failure or the like and recovered from a backup can also be an SLA. An SLA related other than the IO performance or the like can be realized by creating a capacity pool 0206 which can meet each SLA in the storage apparatus 0102 and, at the time of deploying a new volume, using the capacity pool 0206.

In the example of the diagram, a customer whose customer ID 1100 is "0000" has a contract of two virtual volume groups 0001. The virtual volume group IDs 1101 are "0" and "2". The virtual volume group 0001 whose virtual volume group ID 1101 is "0" can store data of "10 TB" in total, IO performance of "upper-limit IOPS=15 k IOPS, average response <2 ms" is guaranteed, and data is stored in the capacity pool 0206 whose RAID level 1104 is "RAID6". The virtual volume group 0001 whose virtual volume group ID 1101 is "1" can store data of "5 TB" in total, the IO performance of "upper-limit IOPS=3 k IOPS, average response <2 ms" is guaranteed, and data is stored in the capacity pool 0206 whose RAID level 1104 is "RAID5".

In the contract management information 0407, the customer or administrator of the storage system 0000 instructs the management operation control unit 0406 to add or change the contract management information 0407 via the management terminal 0101, and the management operation control unit 0406 adds or changes an entry in accordance with the instruction.

FIG. 13 is a diagram illustrating information held in the device management information 0408. The device management information 0408 is information for managing the storage apparatus 0102 by the management system 0100 such as operation information of the storage apparatus 0102 and total capacity, used capacity, RAID level, and the like of each capacity pool 0206. Each entry of the device management information 0408 includes device ID 1200, CPU usage ratio 1201, memory usage ratio 1202, capacity pool ID 1203, total capacity 1204, used capacity 1205, and RAID level 1206.

The device ID 1200 is an ID for uniquely identifying the storage apparatus 0102 in the storage system 0000 by the management system 0100. Although serial numbers are used in the diagram, an ID is not limited to serial numbers but may be characters other than numbers. For example, the manufacturing number of the storage apparatus 0102 may be used as an ID.

The capacity pool ID 1203 is an ID for uniquely identifying the capacity pool 0206 in the storage apparatus 0102, and the management system 0100 uniquely identifies the capacity pool 0206 in the storage system 0000 by the set of the device ID 1200 and the capacity pool ID 1203.

In the example of the diagram, in the storage apparatus 0102 whose device ID 1200 is "0", two capacity pools 0206 exist, and their capacity pool IDs 1203 are "0" and "1". In the capacity pool 0206 whose capacity pool ID 1203 is "0", the total capacity 1204 is "100 TB", the used capacity 1205 is "30 TB", and the RAID level 1026 is "RAID6". In the capacity pool 0206 whose capacity pool ID 1203 is "1", the total capacity 1204 is "40 TB", the used capacity 1205 is "10 TB", and the RAID level 1206 is "RAID5".

In the device management information 0408, at the time of introducing a new storage apparatus 0102, the administrator of the storage system 0000 adds an entry of the storage apparatus 0102. The CPU usage ratio 1201, the memory usage ratio 1202, the capacity pool ID 1203, the total capacity 1204, the used capacity 1205, and the RAID level 1206 are registered or updated by the operation information analysis unit 0405 on the basis of the control information 0301 and the operation information 0302 received from the storage apparatus 0102.

FIG. 14 is a diagram illustrating information held by the virtual volume group management information 0409. As the virtual volume group management information 0409, the used capacity and operation information of the volume group 0208 constructing the virtual volume group 0001 and information for managing the virtual volume group 0001 such as QoS setting value is illustrated. The virtual volume group management information 0409 includes virtual volume group ID 1300, device ID 1301, volume group ID 1302, used capacity 1303, average IOPS 1304, average transfer rate 1305, average response 1306, and QoS setting value 1307.

The volume group ID 1302 is an ID for uniquely identifying a volume group 0208 in the storage apparatus 0102, and the management system 0100 uniquely identifies a volume group 0208 in the storage system 0000 by a set of the device ID 1301 and the volume group ID 1302.

The example of the diagram illustrates that the virtual volume group 0001 whose virtual volume group ID 1300 is "0" is constructed by two volume groups 0208. In the volume group 0208 of "0", the device ID 1301 is "0", the volume group ID 1302 is "0", the used capacity 1303 is "2 TB", the average IOPS 1304 is "4 k IOPS", the average transfer rate 1305 is "16 MB/s", the average response 1306 is "0.5 ms", and the QoS setting value 1307 is "6 k IOPS". In the volume group 0208 of "1", the device ID 1301 is "1", the volume group ID 1302 is "1", the used capacity 1303 is "3 TB", the average IOPS 1304 is "6 k IOPS", the average transfer rate 1305 is "24 MB/s", the average response 1306 is "0.6 ms", and the QoS setting value 1307 is "9 k IOPS".

In the virtual volume group management information 0409, an entry is added when the management operation control unit 0406 receives an instruction of adding contract information. The device ID 1301, the volume group ID 1302, and the used capacity 1303 are added or updated as necessary when the management operation control unit 0406 receives a request of deploying a new volume 0207. The QoS setting value 1307 is updated when the QoS initial adjustment unit 0402 or the QoS periodical adjustment unit 0403 receives an adjustment instruction. The average IOPS 1304, the average transfer rate 1305, and the average response 1306 are registered or updated on the basis of the control information 0301 and the operation information 0302 received from the storage apparatus 0102 by the operation information analysis unit 0405.

FIG. 15 is a diagram illustrating information held by the volume operation information history information 0410. The volume operation information history information 0410 is information indicating time-series history of operation information on the volume 0207 unit basis. Each of entries of the volume operation information history information 0410 includes device ID 1400, volume group ID 1401, volume ID 1402, timestamp 1403, capacity 1404, average IOPS 1405, average transfer rate 1406, and average response 1407.

The volume group ID 1401 is an ID for uniquely identifying a volume group 0208 in the storage apparatus 0102, and the management system 0100 uniquely identifies a volume group 0208 in the storage system 0000 by a set of the device ID 1400 and the volume group ID 1401. The volume ID 1402 is an ID for uniquely identifying a volume 0207 in the storage apparatus 0102, and the management system 0100 uniquely identifies a volume 0207 in the storage system 0000 by a set of the device ID 1400 and the volume ID 1402. The timestamp 1403 is information indicating time at which the operation information is received.

The example of the diagram illustrates that the volume operation information 0311 of a volume group 0208 whose volume group ID 1401 is "0" is received from the storage apparatus 0102 whose device ID 1400 is "0". With respect to a volume 0207 whose volume ID 1402 is "0", operation information is received at times of "10:00:00", "10:00:30", and "10:01:00". The capacity 1404 of the operation information received at "10:00:00" is "100 GB", the average IOPS 1405 is "2 k IOPS", the average transfer rate 1406 is "8 MB/s", and the average response 1407 is "0.4 ms".

In the volume operation information history information 0410, the operation information analysis unit 0405 adds an entry on the basis of the control information 0301 and the operation information 0302 received from the storage apparatus 0102. An entry of the operation information 0302 lapsed by a predetermined period since it was received may be deleted.

FIG. 16 is a diagram illustrating information held in the storage apparatus information history information 0411. History information of the storage apparatus operation information 0310 is information indicating time-series history of operation information on the storage apparatus 0102 unit basis. Each entry of the storage apparatus information history information includes device ID 1500, timestamp 1501, CPU usage ratio 1502, and memory usage ratio 1503.

The example of the diagram illustrates that, from the storage apparatus 0102 whose device ID 1500 is "0", the operation information 0302 is received at times "10:00:00", "10:00:30", and "10:01:00", the CPU usage ratio 1502 of the operation information 0302 received at "10:00:00" is "40%", and the memory usage ratio 1503 is "57%".

In the storage apparatus operation information history information 0411, the operation information analysis unit 0405 adds an entry on the basis of the operation information 0302 received from the storage apparatus 0102. An entry of the operation information 0302 lapsed by a predetermined period since reception may be deleted.

Various information dealt by the storage system 0000 in the embodiment has been described above. In the above description, the management information 0401 which is used for control in the embodiment and is often included in the general storage apparatus 0102 is explained. As necessary, information may be added by adding a column to each of the tables and, when there is unnecessary information, the column may be deleted. For example, when the storage apparatus 0102 has a thin provisioning function, a data compression function, or an overlap eliminating function, a column indicating validity/invalidity of each of the functions may be added in the volume management information. Further, in the volume operation information 0311, a column indicating a data reduction amount by each of the functions may be added.

Figure 17:
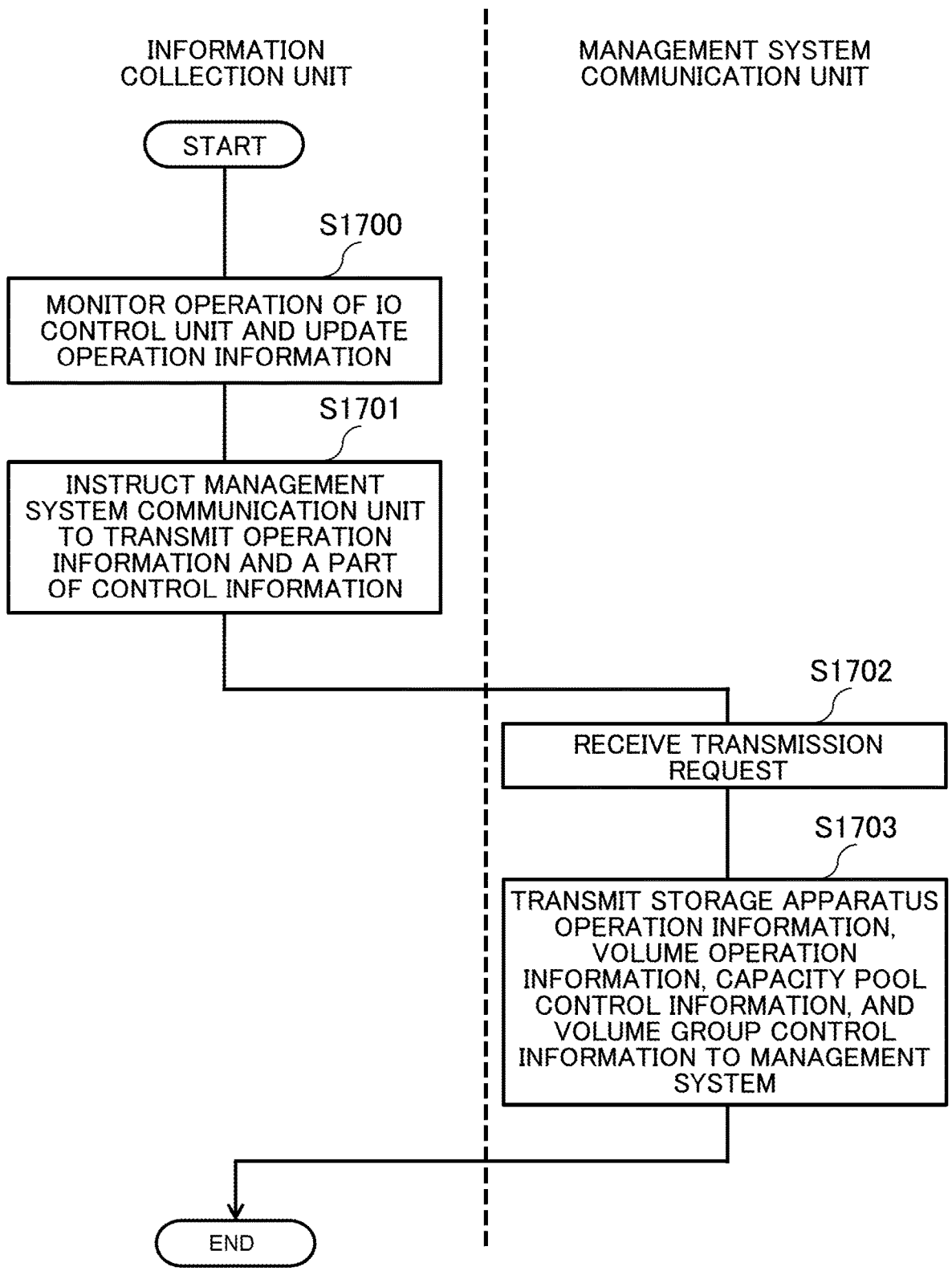
FIG. 17 is a sequence chart illustrating an example of operation information transmitting process of the storage apparatus in the storage system according to the embodiment.

FIG. 17 is a diagram illustrating an operation information transmitting process flow in the storage apparatus 0102. Steps S1700 and S1701 are included in the information collection unit 0304 in the memory 0203 of the storage apparatus 0102, and steps S1702 and S1703 are included in a program of the management system communication unit 0305. All of the steps are executed by the CPU 0202 of the storage apparatus 0102.

In the embodiment, communication of a push type of transferring information to the management system 0100 in which collection of operation information is performed by the storage apparatus 0102 as a process start point is assumed. The process is started by the storage apparatus 0102 every predetermined time. A pull type of requesting the storage apparatus 0102 to transfer information using the management system 0100 as a process start point may be also employed. In this case, the management system 0100 instructs each storage apparatus 0102 to start the process via the storage apparatus communication unit 0404 every predetermined time.

In the process, first, the information collection unit 0304 monitors the operation state of the IO control unit 0303 and, using the result, updates the storage apparatus operation information 0310 and the volume operation information 0311 (S1700). At the time of updating the operation information 0302 on the basis of the operation state, arbitrary data process may be performed. For example, the IO control unit 0303 may perform a process of converting from the cumulative number of IOs processed after the previous collecting process and lapse time to IOPS or, for example, may smooth the operation information 0302 by moving average or the like.

Subsequently, the information collection unit 0304 activates the management system communication unit 0305 and instructs the management system 0100 to transmit the operation information 0302 and a part of the control information 0301 (S1701). The activated management system communication unit 0305 receives the instruction (S1702) and, in accordance with the instruction, transmits the storage apparatus operation information 0310, the volume operation information 0311, the capacity pool control information 0306, and the volume group control information 0309 to the management system 0100 (S1703).

Figure 18:
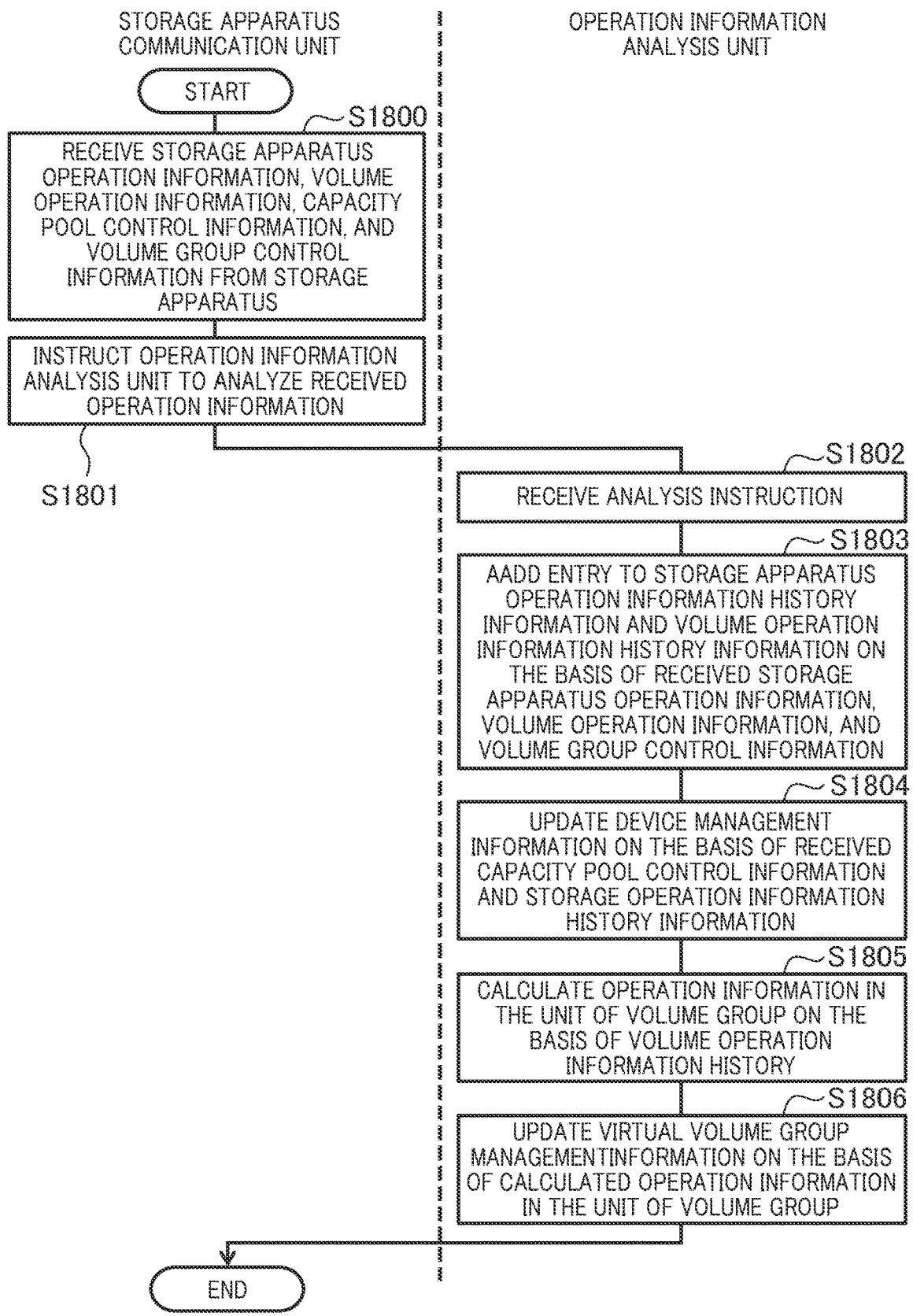
FIG. 18 is a sequence chart illustrating an example of operation information receiving process of the management system in the storage system according to the embodiment.

FIG. 18 is a diagram illustrating an operation information receiving process flow in the management system 0100. Steps S1800 and S1801 are included in a program of the storage apparatus communication unit 0404 in any storage device in the management system 0100, and steps S1802 to S1806 are included in a program of the operation information analysis unit 0405. All of the steps are executed by any computer in the management system 0100.

As described with reference to FIG. 17, the embodiment is on assumption that the operation information 0302 is transmitted from the storage apparatus 0102 to the management system 0100 by the push-type communication. Due to this, the process starts using arrival of the operation information 0302 from the storage apparatus 0102 as a trigger. In the case of obtaining the operation information 0302 by the pull-type communication, the process is started every predetermined time, and acquisition of the operation information 0302 is instructed to each of storage apparatuses 0102 constructing the storage system 0000. More concretely, the device management information 0408 is referred to, and acquisition of the operation information 0302 is instructed via the storage apparatus communication unit 0404 every entry of the storage apparatus 0102.

In the process, the storage apparatus communication unit 0404 receives the storage apparatus operation information 0310, the volume operation information 0311, the capacity pool control information 0306, and the volume group control information 0309 from the storage apparatus 0102 (S1800). Subsequently, the storage apparatus communication unit 0404 activates the operation information analysis unit 0405 and instructs analysis of the operation information 0302 and the control information 0301 received (S1801).

The operation information analysis unit 0405 receives the analysis instruction and executes the following processes (S1802). First, on the basis of the storage apparatus operation information 0310, the volume operation information 0311, and the volume group control information 0309 received, an entry is added to the storage apparatus operation information history information 0411 and the volume operation information history information 0410 (S1803). Concretely, to an entry of the device of the storage apparatus operation information history information 0411, present time is added as the timestamp 1501, and the received storage apparatus operation information 0310 is added to each of the CPU usage ratio 1502 and the memory usage ratio 1503. With respect to the volume operation information history information 0410, first, the ID of a volume group 0208 to which a volume 0207 corresponding to each entry of the volume operation information 0311 received from the received volume group control information 0309 belongs is obtained. To the entry of the volume group 0208 of the device of the volume operation information history information 0410, present time is added as the timestamp 1403, and received the volume operation information 0311 is added to each of the average IOPS 1405, the average transfer rate 1406, and the average response 1407.

Next, the device management information 0408 is updated on the basis of the received capacity pool control information 0306 and the storage apparatus operation information history information 0411 updated in step S2003 (S1804). Concretely, with respect to each entry of the storage apparatus 0102 of the storage apparatus operation information history information 0411, any aggregate calculation process and analyzing process are performed in the time axis direction, steady-state values of the CPU usage ratio and the memory usage ratio of the storage apparatus 0102 are calculated and, using the values, the CPU usage ratio 1201 and the memory usage ratio 1202 in the entry of the storage apparatus 0102 of the device management information 0408 are updated. Using each of the entries of the capacity pool 0206 included in the received capacity pool control information 0306, the capacity pool ID 1203, the total capacity 1204, the used capacity 1205, and the RAID level 1206 of the storage apparatus 0102 of the device management information 0408 are updated or added.

Subsequently, on the basis of the volume operation information history information 0410 updated in step S2003, the operation information 0302 on the volume group 0208 unit basis is calculated (S1805). Concretely, with respect to an entry of each volume 0207 of the storage apparatus 0102 of the volume operation information history information 0410, any aggregate calculation process and an analyzing process are performed in the time direction, steady-state values of the average IOPS, the average transfer rate, and the average response of the volume 0207 are calculated and, further averaging is performed on the volume group 0208 unit basis, thereby calculating steady-state values of the average IOPS 0901, the average transfer rate 0902, and the average response 0903 on the volume group 0208 unit basis.

Subsequently, based on the operation information 0302 on the volume group 0208 unit basis calculated in step S2005, the virtual volume group management information 0409 is updated (S1806). Concretely, an entry of the volume group 0208 of the device in the virtual volume group management information 0409 is updated by using steady-state values of the average IOPS 0901, the average transfer rate 0902, and the average response 0903 on the unit basis of the volume group 0208 calculated in step S1805.

Figure 19:
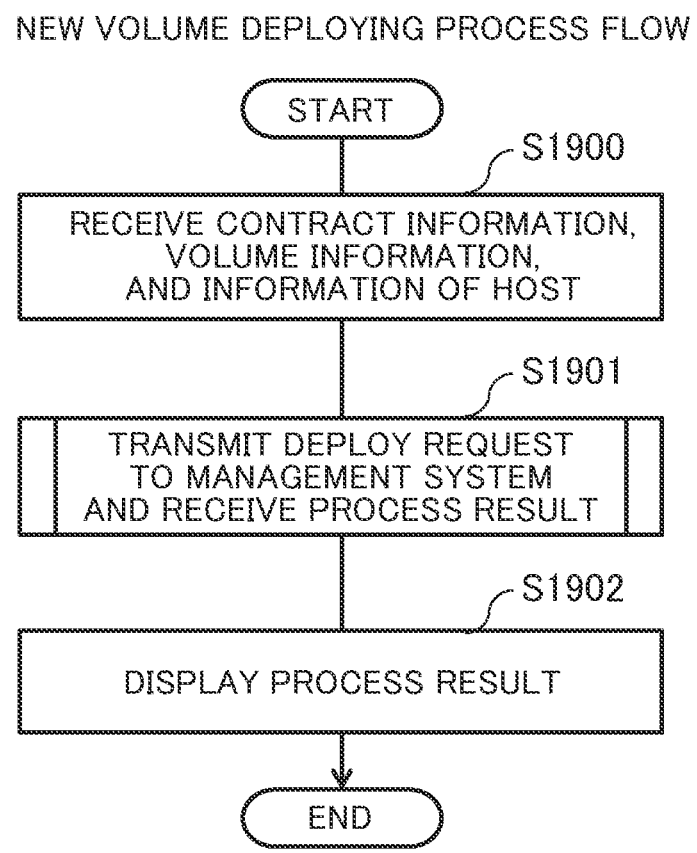
FIG. 19 is a flowchart illustrating an example of new volume deploy process by a management terminal in the storage system according to the embodiment.

FIG. 19 is a diagram illustrating a new volume deploy process flow in the management terminal 0101. The process is included in management software installed in the management terminal 0101 and executed by the management terminal 0101. When the management software is a Web application, the process is executed by a Web browser installed in the management terminal 0101. The process is started when the customer instructs the storage system 0000 to deploy a new volume 0207 by using the management software installed in the management terminal 0101.

In the process, first, the contract information, the information of the volume 0207 to be deployed, and information of the host 0103 connected to the volume 0207 is received from the customer (S1900). The contract information includes the customer ID and the ID of the virtual volume group 0001 which deploys the volume 0207. By including the contract capacity, the contract performance, and the contract RAID level instead of designating the virtual volume group ID, creation of a new virtual volume group 0001 may be instructed together with deployment of a new volume 0207. The information of the volume 0207 includes the volume capacity. The information of the host 0103 includes the host WWN and the LUN. In addition, the kind of the OS (Operating System) of the host 0103, the communication protocol used for connection to the host 0103, information accompanying it, and the like can be designated.

Subsequently, a request of deploying a new volume 0207 is transmitted together with the information received in step S3000 to the management system 0100, and a process result is received (S1901). The management system 0100 which received the deploy request executes the processes of FIG. 20 and reports a process result to the management terminal 0101. Finally, the management terminal 0101 displays the received process result of the new volume deployment to the customer (S1902).

Figure 20:
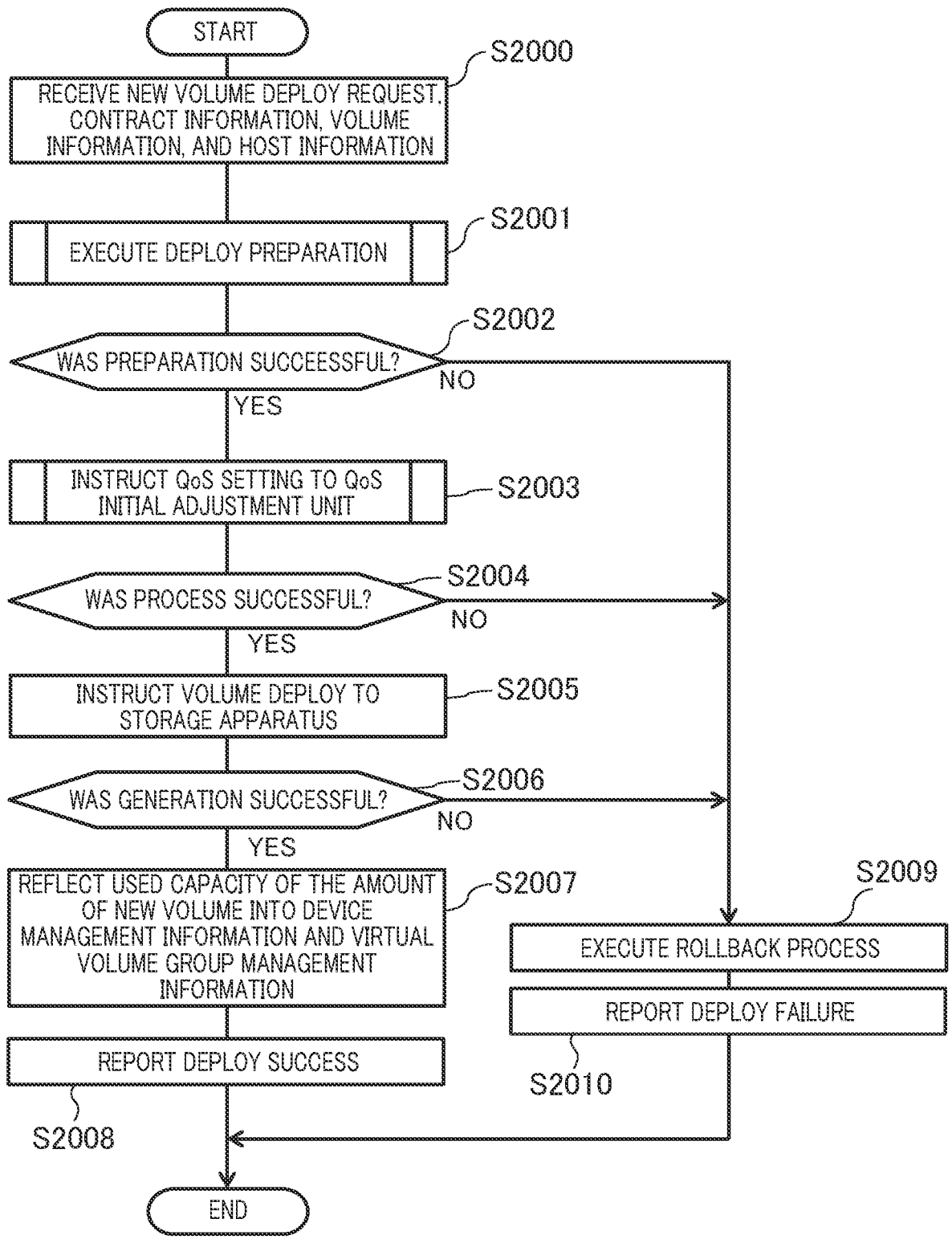
FIG. 20 is a flowchart illustrating an example of new volume deploy process by a management operation control unit in the management system according to the embodiment.

FIG. 20 is a diagram illustrating a new volume deploying process flow by the management operation control unit 0406 of the management system 0100. The process is included in the program of the management operation control unit 0406 and executed by any computer in the management system 0100. The process is started using reception, as an opportunity, of the request to deploy a new volume 0207 from the management terminal 0101 via the management network 0104.

In the process, first, a request to deploy a new volume 0207, contract information, information of the volume 0207 to be deployed, and information of the host 0103 connected to the volume 0207 is received from the management terminal 0101 via the management network 0104 (S2000). The information received is information which is input by the customer in step S3000.

Subsequently, a preparing process for deploying a volume 0207 is executed (S2001). In the preparing process, processes such as determination of whether a precondition for executing processes illustrated in FIG. 21 and deploying a volume 0207 is satisfied, selection of the storage apparatus 0102 to which volume deploy is performed, selection of the capacity pool 0206, selection or creation of a virtual volume group 0001, and selection or creation of the volume group 0208 are performed, and a device ID, a virtual volume group ID, a capacity pool ID, and a volume group ID are reported to the caller. When the preparing process succeeds, the program advances to step S4003. When the preparing process fails, the program advances to step S4009 (S2002).

In step S2003, the QoS initial adjustment unit 0402 is activated and adjustment of the QoS setting of each of volume groups 0208 constructing the virtual volume group 0001 is instructed in preparation for deployment of a new volume 0207. At this time, the capacity of the new volume 0207, the ID of the virtual volume group 0001, and the ID of the volume group 0208 to which the new volume 0207 belongs are also instructed. The reason why the QoS setting is adjusted before a volume 0207 is deployed actually is because there is the possibility that an IO is issued from the host 0103 just after the host 0103 and the volume 0207 are connected. By actually adjusting the QoS setting before deployment of a volume 0207, an IO request issued to another volume 0207 belonging to the volume group 0208 to which a new volume 0207 belongs is prevented from being subjected to an adverse influence by an IO request issued to the new volume 0207 in a state where the QoS setting is not adjusted. When the process of initial adjustment succeeds, the program advances to step S2005. When the process fails, the program advances to step S2009.

In step S2005, the storage apparatus 0102 as a volume deployment destination selected in the preparing process of step S4002 is instructed to deploy a new volume 0207. Concretely, information of a volume 0207 to be deployed and information of the host 0103 connected to the volume 0207 is transmitted to the management system communication unit 0305 of the storage apparatus 0102 via the storage apparatus communication unit 0404, and a process result is received. The information of the volume 0207 includes the volume capacity and the ID of the volume group 0208 to which the volume 0207 belongs. The information of the host 0103 includes the host WWN and the LUN. In addition, the kind of the OS (Operating System) of the host 0103, the communication protocol used for connection to the host 0103, information accompanying it, and the like can be designated. The management system communication unit 0305 which received the volume deployment instruction instructs the IO control unit 0303 to create a new volume 0207. The IC control unit 0303 which received the instruction creates a new volume 0207, updates the volume control information 0307, the volume group control information 0309, and the host control information, and reports a process result. When deployment of a volume 0207 succeeds, the program advances to step S4007. When the deployment fails, the program advances to step S4009 (S2006).

In step S2007, the capacity of the new volume 0207 is reflected as the used capacity 1205 and 1303 in the device management information 0408 and the virtual volume group management information 0409. Concretely, as the used capacity of the entry of the capacity pool 0206 as a storage destination of the volume 0207 in the device management information 0408, the capacity of the new volume 0207 is added. In addition, the capacity of the new volume 0207 is added to the used capacity of the entry of the volume group 0208 to which the new volume 0207 belongs in the virtual volume group management information 0409.

Subsequently, success in deployment is reported to the management terminal 0101 as a deployment request transmitter (S2008).

Step S2009 is executed when a problem occurs during a series of processes and the state of the storage system 0000 is rolled back to a state before the series of processes starts. After that, failure of deployment is reported to the management terminal 0101 as the deployment request transmitter (S2010).

Figure 21:
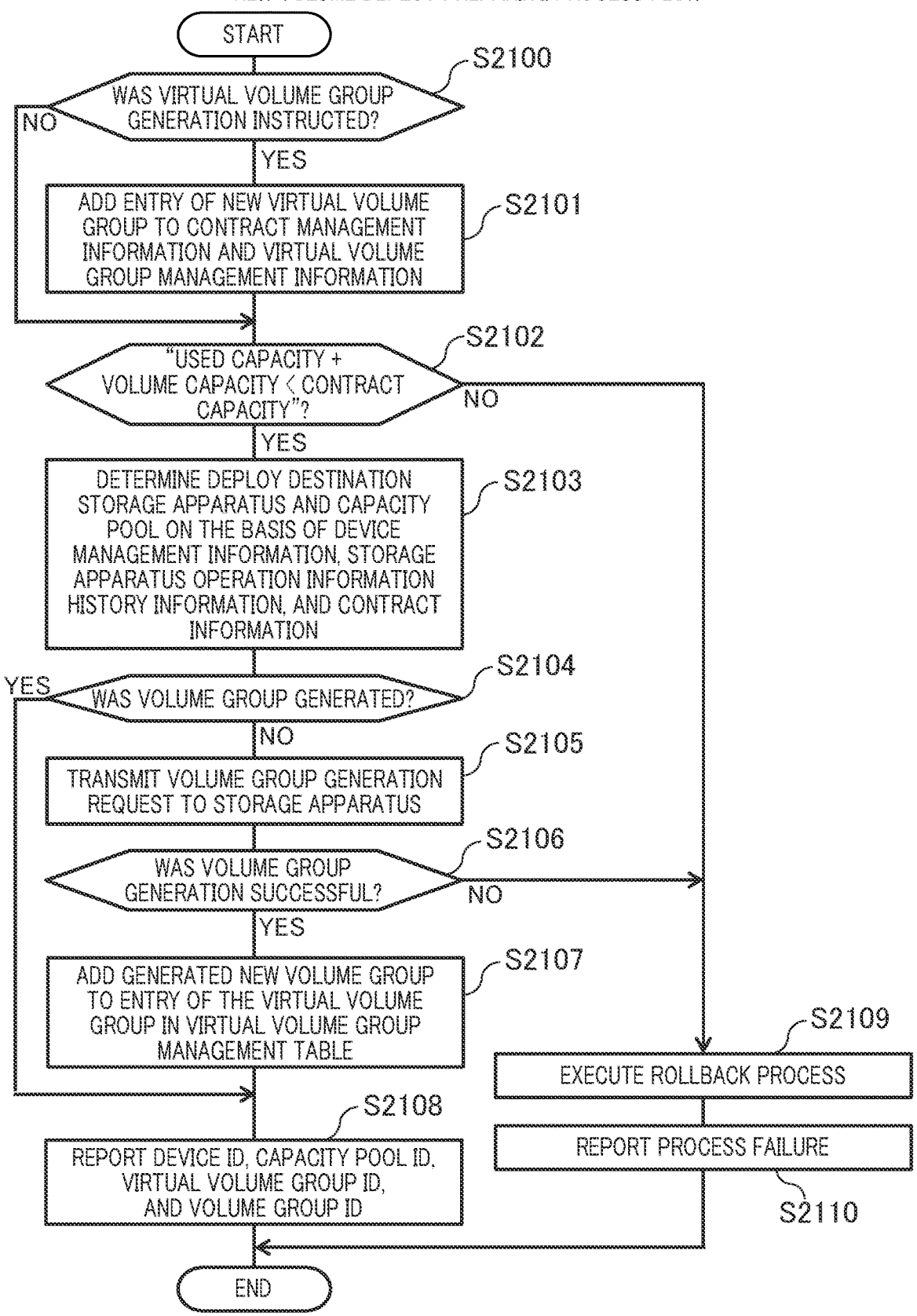
FIG. 21 is a flowchart illustrating an example of new volume deploy preparing process by the management operation control unit of the management system according to the embodiment.

FIG. 21 is a diagram illustrating a new volume deploy preparing process flow by the management operation control unit 0406 of the management system 0100. The process is included in the program of the management operation control unit 0406 and executed by any computer in the management system 0100. The process is a process called in step S2001 in FIG. 20.

In the process, first, whether an instruction of creating the virtual volume group 0001 is included in the volume deploy instruction received from the management terminal 0101 is checked. When it is included, the program advances to step S2101. When it is not included, the program advances to step S2102 (S2100).

In step S2101, an entry of a new virtual volume group 0001 is added to the contract management information 0407 and the virtual volume group management information 0409 by using information such as contract capacity, contract performance, and contract RAID level included in the contract information received from the management terminal 0101. At this stage, no volume group 0208 is registered in the entry of the virtual volume group 0001 added to the virtual volume group management information 0409.

In step S2102, whether the capacity obtained by adding the capacity of a volume 0207 to be deployed to the used capacity of the virtual volume group 0001 as a volume deployment destination is less than the contract capacity or not is determined. When the obtained capacity is less than the contract capacity, the program advances to step S2103. When the obtained capacity is equal to or larger than the contract capacity, the program advances to step S2109. The used capacity of the virtual volume group 0001 is obtained by retrieving the virtual volume group management information 0409 on the basis of the virtual volume group ID included in the volume deployment instruction or the ID of the virtual volume group 0001 newly created in step S2101 and calculating the total of the used capacities 1303 of volume groups 0208 constructing the virtual volume group 0001. The contract capacity is obtained by referring to the contract capacity 1102 of the entry in the virtual volume group 0001 in the contract management information 0407.

In step S2103, on the basis of the device management information 0408, the storage apparatus operation information history information 0411, and contract information, the deploy destination storage apparatus 0102 and the capacity pool 0206 of the new volume 0207 are determined. As a method of the determination, for example, there is a method such that, first, an SLA condition other than the IO performance such as the contract RAID level 1104 is obtained from the entry of the virtual volume group 0001 of the contract management information 0407, the device management information 0408 is retrieved by using the SLA condition and information of the capacity of the volume 0207 to be deployed, and a list of storage apparatuses 0102 and capacity pools 0206 which satisfy the SLA condition and can store the volume 0207 to be deployed is obtained. After that, for each of the storage apparatuses 0102 included in the list, the storage apparatus 0102 and the capacity pool 0206 having the lowest load are determined with reference to the CPU usage ratios 1201 and 1502 and the memory usage ratios 1202 and 1503 in the device management information 0408 and the storage apparatus operation information history information 0411.

In step S2104, by referring to an entry of the virtual volume group 0001 of the virtual volume group management information 0409, whether the storage apparatus 0102 determined in step S2103 is included as the volume group 0208 constructing the virtual volume group 0001 or the storage apparatus 0102 is checked. When it is not included, the program advances to step S2105 and a new volume group 0208 is created. When it is included, the program advances to step S2108.

In step S2105, an instruction is given to the storage apparatus 0102 determined in step S2103 to create a new volume group 0208. Concretely, creation of a new volume group 0208 is instructed to the management system communication unit 0305 of the storage apparatus 0102 via the storage apparatus communication unit 0404 and the ID of the volume group 0208 created as a process result is received. The management system communication unit 0305 which received the instruction of creating the new volume group 0208 instructs the IO control unit 0303 to create a new volume group 0208, and the IO control unit 0303 which receives the instruction creates a new volume group 0208, updates the volume group control information 0309, and reports the volume group ID 0800 generated as a process result. When creation of the volume group 0208 succeeds, the program advances to step S2107. When it fails, the program advances to step S2109 (S2106).

In step S2107, the new volume group 0208 created in step S2105 is added to the entry of the virtual volume group 0001 of the virtual volume group management information 0409.

Subsequently, the virtual volume group ID included in the volume deployment instruction or the ID of the virtual volume group 0001 newly created in step S2101, the ID of the storage apparatus 0102 and the ID of the capacity pool 0206 determined in step S2103, the ID of the volume group 0208 checked in step S2104 or the ID of the volume group 0208 newly created in step S2105 are reported to a caller process (S2108).

Step S2109 is executed when any problem occurs during the series of processes to roll back the state of the storage system 0000 to a state before the series of processes starts. After that, to the caller process, a process failure is reported (S2110).

Figure 22:
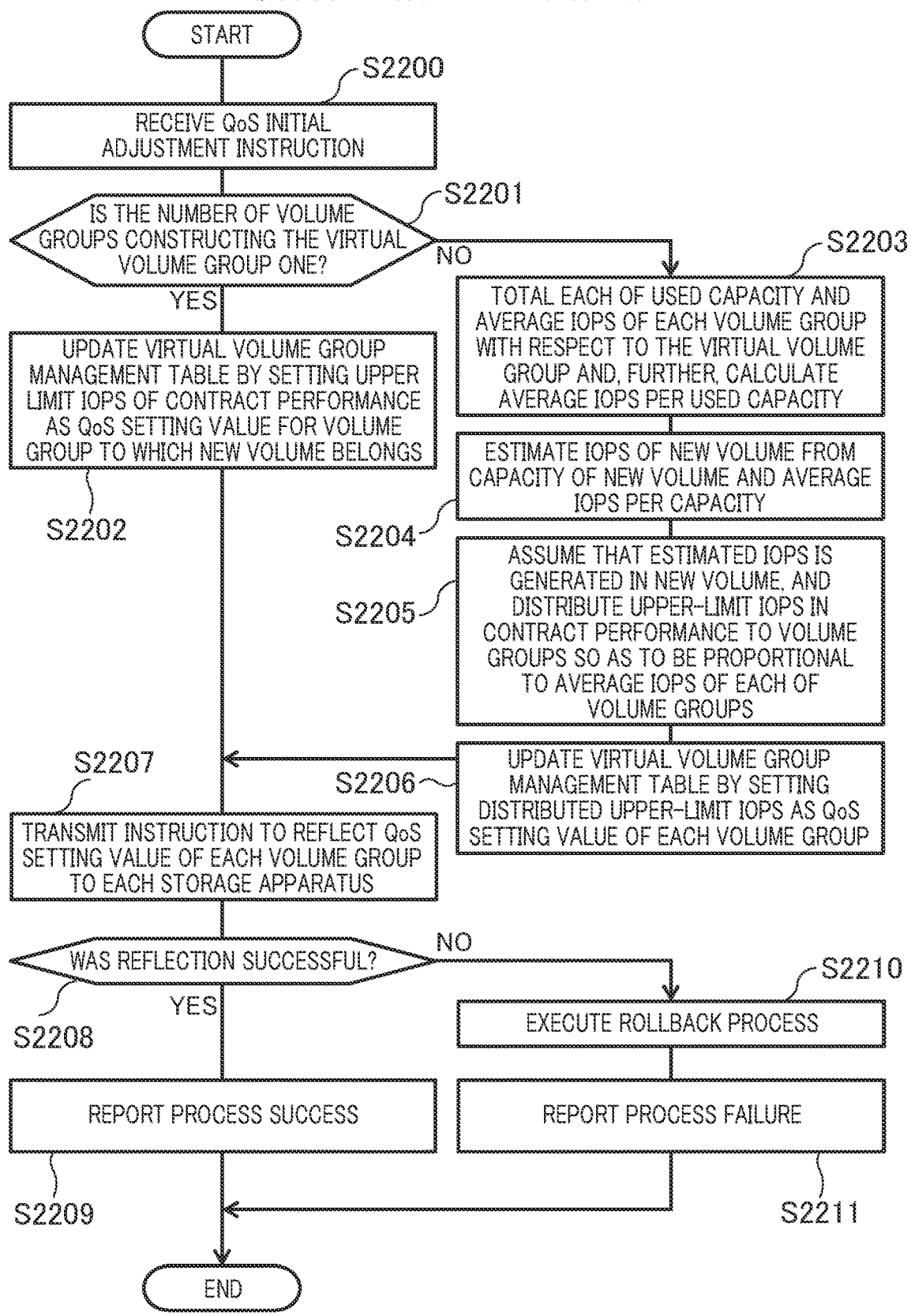
FIG. 22 is a flowchart illustrating an example of QoS initial adjustment process by a QoS initial adjustment unit of the management system according to the embodiment.

FIG. 22 is a diagram illustrating a QoS initial adjustment process flow by the QoS initial adjustment unit 0402 of the management system 0100. The process is included in the program of the QoS initial adjustment unit 0402 and executed by any computer constructing the management system 0100. The process is started by the step S2003 in FIG. 20.

In the process, first, as a QoS initial adjustment instruction, the capacity of the new volume 0207, the ID Of the virtual volume group 0001, and the ID of the volume group 0208 to which the new volume 0207 belongs are received from the caller (S2200). Subsequently, referring to the entry of the virtual volume group 0001 of the virtual volume group management information 0409, when the number of volume groups 0208 constructing the virtual volume group 0001 is one, the program advances to step S2202. When the number is two or more, the program advances to step S2203 (S2201).

In the case where the program advances to step S2202, with reference to the entry of the virtual volume group 0001 of the contract management information 0407, the upper-limit IOPS of the contract performance 1103 is obtained, and the obtained upper-limit IOPS is set as the QoS setting value 1307 of the entry of the virtual volume group 0001 of the virtual volume group management information 0409. The reason is that since only one volume group 0208 exists, the upper-limit IOPS of the contract performance 1103 can be consumed only by the volume group 0208. In the case where there are two or more volume groups 0208, the upper-limit IOPS has to be divided to the volume groups 0208. This will be described in step S2203. After the process in S2202, the program advances to step S2207.

In step S2203, the entry of the virtual volume group 0001 of the virtual volume group management information 0409 is referred to, the used capacity 1303 and the average IOPS 1304 are totaled with respect to each of the volume groups 0208 constructing the virtual volume group 0001, and the total of the average IOPS 1304 is divided by the total of the used capacities 1303, thereby calculating an average IOPS per used capacity. Subsequently, by multiplying the average IOPS per used capacity by the capacity of the new volume 0207, an average IOPS of the new volume 0207 is estimated (S2204).

Subsequently, with reference to the entry of the virtual volume group 0001 of the contract management information 0407, the upper-limit IOPS of the contract performance 1103 is obtained, and the upper-limit IOPS is distributed to the volume groups 0208 so as to be proportional to the average IOPS of the volume groups 0208 constructing the virtual volume group 0001 (S2205). At this time, the volume group 0208 to which the new volume 0207 belongs is calculated on assumption that average IOPS of the new volume 0207 estimated in step S2204 is additionally generated. The distributing method described in steps S2203 to S2205 is an example. The distribution may be performed by using another method.

Next, using the upper-limit IOPS distributed to each of the volume groups 0208 in step S2205 as the QoS setting value of the volume group 0208, the QoS setting value 1307 of the entry of the virtual volume group 0001 of the virtual volume group management information 0409 is updated (S2206). After the process is finished, the program advances to step S2207.

In step S2207, an instruction to reflect the QoS setting value of each volume group 0208 is transmitted to each of the storage apparatuses 0102 constructing the virtual volume group 0001. Concretely, the ID of the volume group 0208 and the QoS setting value are transmitted to the management system communication unit 0305 of each storage apparatus 0102 via the storage apparatus communication unit 0404, and a process result is received. The management system communication unit 0305 which receives the QoS setting value reflection instruction instructs the IC control unit 0303 to change the QoS setting value. The IO control unit 0303 which receives the instruction updates the QoS setting 0801 of the volume group 0208 in the volume control information 0309, and reports a process result. When the reflection of the QoS setting value in all of the storage apparatuses 0102 succeeds, the program advances to step S2209. When there is a storage apparatus 0102 in which the reflection fails, the program advances to step S2210 (S2208).

In step S2209, a process success is reported to the caller. Step S2210 is executed when any problem occurs during the series of processes, and the state of the storage system 0000 is rolled back to a state before the series of processes started. After that, a deploy failure is reported to the management terminal 0101 as the deployment request transmitter (S2211).

FIG. 23 is a diagram illustrating an entire process flow of QoS periodical adjustment by the QoS periodical adjustment unit 0403 of the management system 0100. The process is included in the program of the QoS periodical adjustment unit 0403 and executed by any computer constructing the management system 0100. The process is started every predetermined time.

In the process, first, the virtual volume group management information 0409 is referred to, and the virtual volume groups 0001 are selected in order as targets of the following processes (S2300).

Subsequently, with respect to the selected virtual volume group 0001, the process of FIG. 24 is executed, and the QoS setting value is adjusted (S2301).

Then, whether the process is completed or not with respect to all of the virtual volume groups 0001 of the virtual volume group management information 0409 is checked. When the process is completed, the process is finished. When the process is not completed, the program returns to step S2300, and the next virtual volume group 0001 is selected (S2302).

FIG. 24 is a diagram illustrating a process flow of the QoS periodical adjustment by the QoS periodical adjustment unit 0403 of the management system 0100. The process is included in the program of the QoS periodical adjustment unit 0403 and executed by any computer constructing the management system 0100. The process is called every virtual volume group 0001 constructing the storage system by step S2301 in FIG. 23.

In the process, first, an entry of the virtual volume group 0001 of the virtual volume group management information 0409 and an entry of the virtual volume group 0001 of the contract management information 0407 are referred to, and whether a total value of the average IOPS 1304 of volume groups 0208 constructing the virtual volume group 0001 is smaller than the upper limit IOPS of the contract performance 1103 is determined. When the total value is smaller than the upper limit IOPS of the contract performance 1103, the program advances to step S2402. If not, the program advances to step S2401 (S2400).

In step S2401, an entry of the virtual volume group 0001 of the virtual volume group management information 0409 is referred to, and the QoS setting value 1307 is adjusted so that the average responses 1306 of the volume groups 0208 constructing the virtual volume group 0001 become uniform. Concretely, for example, a method is considered such that the QoS setting value 1307 of the volume group 0208 whose average response 1306 is the lowest is decreased by a predetermined amount, and the QoS setting value 1307 of the volume group 0208 whose average response 1306 is the highest is increased only by the decreased amount. After the process, the program advances to step S2405.

The reason why the average responses 1306 of the volume groups 0208 are made uniform in the step is as follows. In the case where the program reaches the step by the determination in step S2400, the host 0103 issues IO equal to or larger than the upper-limit IOPS of the contrast performance 1103 to each of the storage apparatuses 0102 connected. Since the QoS is set in each of the volume groups 0208, the storage apparatus 0102 controls so that the IOPS does not exceed the upper limit by intentionally delaying the IO process issued to the volume 0207 belonging to the volume group 0208. As a result of the process delay by the QoS control, the average response 1306 of the volume group 0208 increases according to the degree of excess from the upper-limit IOPS of the IO issued by the host 0103. In the step, to set a state where the intentional IO process delay by the QoS control of each of the storage apparatuses 0102 operates uniformly to the volume groups 0208, the upper-limit IOPS of the volume groups 0208 is distributed so that the average response 1306 of the volume groups 0208 becomes uniform.

In step S2402, referring to the virtual volume group management information 0409, with respect to each of the volume groups 0208 constructing the virtual volume group 0001, whether a volume group 0208 whose average IOPS 1304 is equal to or larger than the QoS setting value 1307 exists or not is checked. When it exists, the program advances to step S2404. When it does not exist, the program advances to step S2403.

When a volume group 0208 whose average IOPS 1304 is equal to or larger than the QoS setting value 1307 exists, it means that distribution of the upper-limit IOPS to the volume groups 0208 is not proper and intentional IO process delay by the QoS control of the storage apparatus 0102 occurs in a part of the volume groups 0208. Since the average IOPS 1304 of the entire virtual volume group 0001 is less than the upper-limit IOPS of the contract performance by the determination in step S2400, by properly distributing the upper-limit IOPS, the IO process delay is solved.

In step S2403, referring to the virtual volume group management information 0409 and the contract management information 0407, with respect to volume groups 0208 constructing the virtual volume group 0001, whether a volume group 0208 whose average response 1306 exceeds the average response of the contract performance 1103 exists or not is determined. When it exists, the program advances to step S2408. When it does not exist, the program advances to step S2404.

In the case where the program reaches this step in the determination in step S2404, the IO process delay by the QoS control does not occur in any of the volume groups 0208. Nevertheless, when the volume group 0208 whose average response 1306 exceeds the average response of the contract performance 1103 exists, it is estimated that overload occurs in the storage apparatus 0102 itself. On the contrary, when there is no volume group 0208 whose average response 1306 does not exceed the average response of the contract performance 1103, it can be said that all of the contract performance 1103 is satisfied.

In step S2408, to solve the overload of the storage apparatus 0102 itself, the process of FIG. 25 is called to migrate a volume 2027 belonging to the volume group 0208 whose average response 1306 exceeds the average response of the contract performance 1103 to another storage apparatus 0102. In the case where there are a plurality of volume groups 0208 whose average responses exceed the average response of the contract performance 1103, the process of FIG. 25 may be called for each of the volume groups 0208 or may be called only for the volume group 0208 whose average response 1306 is the highest.

In step S2404, the upper limit IOPS of the contract information is distributed to the volume groups 0208 so as to be proportional to the average IOPS of the volume groups 0208 constructing the virtual volume group 0001 and, using the distributed upper-limit IOPS as the QoS setting value 1307 of the volume group 0208, the entry of the virtual volume group 0001 in the virtual volume group management information 0409 is updated.

Subsequently, to each of the storage apparatuses 0102 constructing the virtual volume group 0001, an instruction to reflect the QoS setting value of each of the volume groups 0208 is transmitted (S2405). Concretely, the ID and the QoS setting value of the volume group 0208 are transmitted to the management system communication unit 0305 of each storage apparatus 0102 via the storage apparatus communication unit 0404, and a process result is received.

The management system communication unit 0305 which received the QoS setting value reflection instruction instructs the IO control unit 0303 to change the QoS setting value. The IO control unit 0303 which received the instruction updates the QoS setting 0801 of the volume group 0208 in the volume group control information 0309, and reports the process result. When the reflection of the QoS setting value succeeds in all of the storage apparatuses 0102, the process is finished. When there is a storage apparatus 0102 in which the reflection fails, the program advances to step S2407 (S2406).

Step S2407 is executed when a problem occurs during the series of processes, and the state of the storage system 0000 is rolled back to a state before the series of processes are started. After that, the process is finished.

FIG. 25 is a diagram illustrating a volume migration process flow by the QoS periodical adjustment unit 0403 of the management system 0100. The process is included in the program of the QoS periodical adjustment unit 0403 and is executed by any computer constructing the management system 0100. The process is called by the step S2408 in FIG. 24.

In the process, first, the process of FIG. 26 is called to prepare volume migration and, as a process result, the ID of a volume 0207 to be migrated, the ID of a storage apparatus 0102 as a migration destination, the ID of a capacity pool as a migration destination, the ID of a volume group 0208 as a migration destination, and a result of distribution of the upper-limit IOPS to the volume groups 0208 are received (S2500).

When the preparing process succeeds, the program advances to step S2502. When the preparing process fails, the program advances to step S2509 (S2501).

In step S2502, an instruction to reflect a result of distribution of the upper-limit IOPS as a QoS setting value is given to the migration-destination storage apparatus 0102. Concretely, the ID of the volume group 0208 and the QoS setting value are transmitted to the management system communication unit 0305 of the migration-destination storage apparatus 0102 via the storage apparatus communication unit 0404, and a process result is received. The management system communication unit 0305 which receives the QoS setting value reflection instruction instructs the IO control unit 0303 to change the QoS setting value. The IO control unit 0303 which receives the instruction updates the QoS setting 801 of the volume group 0208 of the volume group control information 0309, and reports a process result.

The reason why the QoS setting value is reflected prior to actual volume migration only to the migration-destination storage apparatus 0102 is to prevent the adverse influence to other volumes 0207 belonging to the migration-destination volume group 0208 by an IO request issued during volume migration or immediately after from the host 0103 to a volume 0207 to be migrated.

When the reflection succeeds, the program advances to step S2504. When the reflection fails, the program advances to step S2509 (S2503).

In step S2504, volume migration execution is instructed to the storage apparatus 0102 (migration-source storage apparatus) to which a volume 0207 to be migrated belongs. Concretely, the ID of a volume to be migrated, the ID of the migration-destination storage apparatus 0102, and the ID of the migration-destination capacity pool 0206 are transmitted to the management system communication unit 0305 of the migration-source storage apparatus 0102 via the storage apparatus communication unit 0404, and a process result is received. The management system communication unit 0305 which receives the volume migration instruction instructs the IO control unit 0303 to execute volume migration. The IO control unit 0303 which receives the instruction communicates with the IO control unit 0303 of the migration-destination storage apparatus 0102 via the storage network 0106 and the management network 0104 as necessary and transfers control information and data stored in the volume 0207, thereby executing the process related to the volume migration and reporting the process result. Since the concrete process of the volume migration is not related to the present invention and is a known technique, more detailed description will be omitted.

When the volume migration succeeds, the program advances to step S2506. When it fails, the program advances to step S2509 (S2505).

Subsequently, to each of the storage apparatuses 0102 constructing the virtual volume group 0001, the instruction to reflect the upper-limit IOPS distributed to each volume group 0208 as the QoS setting value is transmitted (S2506). Concretely, the ID of a volume group 0208 and, as the QoS setting value, the upper-limit IOPS distributed to the volume group 0208 are transmitted to the management system communication unit 0305 of each of the storage apparatuses 0102 via the storage apparatus communication unit 0404, and a process result is received. The management system communication unit 0305 which received the instruction to reflect the QoS setting value instructs the IO control unit 0303 to change the QoS setting value. The IO control unit 0303 which received the instruction updates the QoS setting 0801 of the volume group 0208 in the volume group control information 0309 and reports a process result. When the reflection of the QoS setting value succeeds for all of the storage apparatuses 0102, the program advances to step S2508. When there is a storage apparatus 0102 to which the reflection fails, the program advances to step S2509 (S2507).

In step S2508, with respect to each of the volume groups 0208 constructing the virtual volume group 0001 in the virtual volume group management information 0409, by using the upper-limit IOPS distributed in step S2500, the QoS setting value 1307 of each of the volume groups 0208 is updated. After that, the process is finished.

Step S2509 is executed when a problem occurs during the series of processes to roll back the state of the storage system 0000 to a state before the series of processes started. After that, the process is finished.

FIG. 26 is a diagram illustrating a volume migration preparing process flow by the QoS periodical adjustment unit 0403 of the management system 0100. The process is included in the program of the QoS periodical adjustment unit 0403 and is executed by any computer constructing the management system 0100. The process is called by step S2500 in FIG. 25.

In the process, first, a volume 0207 to be migrated in volume migration is selected from a migration-source volume group 0208 of a migration-source storage apparatus 0102 (S2600). Concretely, for example, on the basis of the volume operation information history information 0410, a volume 0207 whose average response 1407 is the longest is selected as a migration target from volumes 0207 belonging to the volume group 0208. In this case, a steady-state value of the average response calculated by any of aggregate calculation process or analyzing process in the time direction on the volume 0207 unit basis may be used.

Subsequently, on the basis of the contract management information 0407, the device management information 0408, the storage apparatus operation information history information 0411, and the volume operation information history information 0410, a storage apparatus 0102 and a capacity pool 0206 as a migration destination of the volume migration are selected (S2601). Concretely, for example, first, an SLA condition other than the IO performance such as the contract RAID level 1104 is obtained from the entry of the virtual volume group 0001 of the contract management information 0407, the device management information 0408 is retrieved by using the SLA condition and information of the capacity of the volume 0207 to be migrated, and a list of storage apparatuses 0102 and capacity pools 0206 which satisfy the SLA condition and can store the volume 0207 to be migrated is obtained. The capacity of the volume 0207 to be migrated can be obtained by referring to an entry of the latest timestamp 1403 of the volume 0207 in the volume capacity information history information 0410. After that, for each of the storage apparatuses 0102 included in the list, the storage apparatus 0102 and the capacity pool 0206 having the lowest load are determined with reference to the CPU usage ratio 1502 and the memory usage ratio 1503 in the device management information 0408 and the storage apparatus operation information history information 0411.

Subsequently, by referring to an entry of the virtual volume group 0001 of the virtual volume group management information 0409, whether the storage apparatus 0102 determined in step S2601 is included as the volume group 0208 constructing the virtual volume group 0001 or the storage apparatus 0102 is checked. When it is not included, the program advances to step S2603 and a new volume group 0208 is created. When it is included, the program advances to step S2606.

In step S2603, an instruction is given to the storage apparatus 0102 determined in step S2601 to create a new volume group 0208. Concretely, creation of a new volume group 0208 is instructed to the management system communication unit 0305 of the storage apparatus 0102 via the storage apparatus communication unit 0404 and the ID of the volume group 0208 generated as a process result is received. The management system communication unit 0305 which received the instruction of creating the new volume group 0208 instructs the IO control unit 0303 to create a new volume group 0208, and the IO control unit 0303 which received the instruction creates a new volume group 0208, updates the volume group control information 0309, and reports the volume group ID 0800 created as a process result. When creation of the volume group 0208 succeeds, the program advances to step S2605. When it fails, the program advances to step S2610 (S2604).

In step S2605, the new volume group 0208 created in step S2603 is added to the entry of the virtual volume group 0001 of the virtual volume group management information 0409.

In step S2606, referring to the volume operation information history information 0410, the average IOPS 1405 of a volume 0207 to be migrated is obtained. Alternatively, a steady-state value of an average IOPS calculated by any aggregate calculating process or analyzing process in the time direction may be used.

Subsequently, on the basis of the average IOPS 1405 of the volume 0207 to be migrated obtained in step S2606, the average IOPS of volume groups 0208 after execution of the volume migration is estimated (S2607). Concretely, on assumption that the average IOPS of the volume 0207 to be migrated obtained in step S2606 is migrated from the volume group 0208 of the migration-source storage apparatus 0102 to the volume group 0208 of the migration-destination storage apparatus 0102, as the average IOPS of each volume group 0208 after execution of the volume migration, a value obtained by adding/subtracting the value of the average IOPS of each volume group 0208 in the virtual volume group management information 0409 is estimated.

Then, with reference to the entry of the virtual volume group 0001 in the contract management information 0407, the upper-limit IOPS of the contract performance 1103 is obtained, and the upper-limit IOPS is distributed to the volume groups 0208 so as to be proportional to the average IOPS of the volume groups 0208 estimated in step S2607 (S2608).

Finally, as a result of execution of the process, the ID of the volume to be migrated selected in step S2600, the ID of the storage apparatus 0102 as a migration destination and the ID of the capacity pool 0206 selected in step S2601, the ID of the migration-destination volume group 0208 checked in step S2602 or the ID of the volume group 0208 created in step S2605, and a result of distribution to the volume groups 0208 of the upper-limit IOPS by step S2608 are reported to the caller process.

According to the embodiment configurated as described above, the QoS function on the basis of the unit of a virtual volume group over a plurality of storage apparatuses can be realized.

Although the main embodiment of the present invention has been described above, this is an example for describing the present invention, and the scope of the present invention is not limited to only the embodiment. All of the components described do not have to be always provided. A part of the configuration of an embodiment may be replaced by the configuration of another embodiment, or may be added. Similarly, a part of the configurations of the embodiments can be changed/deleted as necessary.

A part or all of the above-described configurations, functions, processing units, processing means, and the like may be realized by, for example, hardware by designing them in an integrated circuit. The present invention can be realized also by a program code of software realizing the functions of the embodiment. In this case, a recording medium in which the program code is recorded is provided to a computer, and a processor of the computer reads the program code stored in the storage medium. In this case, the program code itself read from the storage medium realizes the function of the above-described embodiment, and the program code itself and the storing medium which stores it are components of the present invention. As the recording medium for supplying such a program code, for example, a flexible disk, a CD-ROM, a DVD-ROM, a hard disk, an SSD (Solid State Drive), an optical disk, a magneto-optical disk, a CD-R, a magnetic tape, a nonvolatile memory card, a ROM, or the like can be used.

The program code realizing the function described in the embodiment can be installed by, for example, a program or script language in a wide range such as assembler, C/C++, Go, perl, Shell, PHP, Java (registered trademark), or Python.

In the foregoing embodiment, the control lines and information lines which are considered to be necessary for explanation have been illustrated. All of control lines and information lines in manufacture are not always illustrated. All of the components may be mutually connected.

What is claimed is:

1. A storage system comprising:
    a plurality of storage apparatuses each having a processor, providing a volume, and processing data which is input/output to/from the volume;
    a storage device physically storing the data; and
    a management system managing the plurality of storage apparatuses,
    wherein the management system forms a virtual volume group by using the plurality of volumes provided by the plurality of storage apparatuses,
    a QoS setting value including a data input/output amount is set for the virtual volume group,
    IO processing ability provided from each of the volumes to the virtual volume group is set so as to satisfy the QoS setting value, and
    the management system sets the IO processing ability provided from each of the volumes to the virtual volume group on the basis of operation information of each of the volumes.

2. The storage system according to claim 1, wherein a physical volume group is set by a single volume or a plurality of volumes operating in the same storage apparatus,
    the physical volume group has IO processing ability, and
    the management system provides the IO processing ability from the IO processing ability of the physical volume group to a virtual volume group to which the volume of the physical volume group is contributed.

3. The storage system according to claim 2, wherein the operation information includes average response of each of the volumes, and
    the management system adjusts the IO processing ability provided from the physical volume group on the basis of the average response of the volumes in the virtual volume group.

4. The storage system according to claim 3, wherein in the case where an input/output amount of data to/from the virtual volume group is larger than a data input/output amount of the QoS setting value, the IC processing ability is adjusted.

5. The storage system according to claim 2, wherein the operation information includes an average data input/output amount of each of the volumes, and
    in the case where there is the volume that the data input/output amount to/from the virtual volume group is smaller than the data input/output amount of the QoS setting value and the data input/output amount requested from the virtual volume group to the physical volume group is larger than the provided IO processing ability,
    the IO processing ability provided to each of the physical volume groups is adjusted in the virtual volume group on the basis of the average data input/output amount by the physical volume group.

6. The storage system according to claim 2, wherein the QoS setting value includes average response,
    the operation information includes an average data input/output amount of each of the volumes, and
    in the case where there is no volume that the data input/output amount to/from the virtual volume group is smaller than the data input/output amount of the QoS setting value and the average response is longer than the average response included in the QoS setting value,
    the IO processing ability provided to each of the physical volume groups is adjusted in the virtual volume group on the basis of the average data input/output amount by the physical volume group.

7. The storage system according to claim 2, wherein the QoS setting value includes average response,
    the operation information includes an average data input/output amount of each of the volumes, and
    in the case where there is the volume that the data input/output amount to/from the virtual volume group is smaller than the data input/output amount of the QoS setting value and the average response is longer than the average response included in the QoS setting value,
    the volume is migrated among the physical volume groups of the storage apparatus.

8. A QoS management method in a storage system comprising:
    a plurality of storage apparatuses each having a processor, providing a volume, and processing data which is input/output to/from the volume;
    a storage device physically storing the data; and
    a management system managing the plurality of storage apparatuses,
    wherein the management system forms a virtual volume group by using the plurality of volumes provided by the plurality of storage apparatuses,
    a QoS setting value including a data input/output amount is set for the virtual volume group,
    IO processing ability provided from each of the volumes to the virtual volume group is set so as to satisfy the QoS setting value, and
    the management system sets the IO processing ability provided from each of the volumes to the virtual volume group on the basis of operation information of each of the volumes.

* * * * *